US008837257B2

(12) United States Patent
Surprenant et al.

(10) Patent No.: US 8,837,257 B2
(45) Date of Patent: Sep. 16, 2014

(54) ACOUSTIC MODULATION PROTOCOL

(75) Inventors: Richard S. Surprenant, Santa Clara, CA (US); Chad G. Seguin, Morgan Hill, CA (US); Brett L. Paulson, Palo Alto, CA (US)

(73) Assignee: Verifone Systems, Incorporated, San Jose, CA (US)

( * ) Notice: Subject to any disclaimer, the term of this patent is extended or adjusted under 35 U.S.C. 154(b) by 519 days.

(21) Appl. No.: 13/151,516

(22) Filed: Jun. 2, 2011

(65) Prior Publication Data

US 2012/0134238 A1 May 31, 2012

Related U.S. Application Data

(60) Provisional application No. 61/417,705, filed on Nov. 29, 2010.

(51) Int. Cl.

| | |
|---|---|
| ***H04B 1/00*** | (2006.01) |
| ***H04L 27/00*** | (2006.01) |
| ***H04L 25/38*** | (2006.01) |
| ***H04S 1/00*** | (2006.01) |

(52) U.S. Cl.

CPC .................................... *H04S 1/007* (2013.01)

USPC ............ 367/137; 375/141; 375/370; 375/326

(58) Field of Classification Search

None

See application file for complete search history.

(56) References Cited

U.S. PATENT DOCUMENTS

| | | | | |
|---|---|---|---|---|
| 5,359,367 | A | 10/1994 | Stockill | |
| 5,604,771 | A * | 2/1997 | Quiros | 375/326 |
| 6,038,436 | A | 3/2000 | Priest | |
| 7,796,978 | B2 | 9/2010 | Jones et al. | |
| 2002/0101917 | A1 | 8/2002 | Bibl | |
| 2002/0176584 | A1 * | 11/2002 | Kates | 381/60 |
| 2003/0031318 | A1 | 2/2003 | Troyansky | |
| 2003/0144035 | A1 | 7/2003 | Weinblatt | |
| 2003/0232593 | A1 | 12/2003 | Wahlroos et al. | |
| 2004/0031856 | A1 | 2/2004 | Atsmon | |
| 2005/0223030 | A1 | 10/2005 | Morris | |

(Continued)

FOREIGN PATENT DOCUMENTS

| | | | |
|---|---|---|---|
| GB | 2363275 | A | 12/2001 |
| GB | 2363275 | B | 7/2002 |

OTHER PUBLICATIONS

Nielsen Media-Sync Platform Backs ABC's My Generation Sync iPad App—WebNewser, David Cohen, Sep. 16, 2010.

(Continued)

*Primary Examiner* — Isam Alsomiri

*Assistant Examiner* — Hovhannes Baghdasaryan

(74) *Attorney, Agent, or Firm* — Convergent Law Group LLP

(57) ABSTRACT

Exemplary embodiments provide a computer-implemented method for generating a modulated acoustic carrier signal for wireless transmission from a speaker of a transmit device to a microphone of a receive device. Aspects of the exemplary embodiments include converting a message to binary data; modulating one or more selected frequencies for one or more acoustic carrier signals based on the binary data to generate one or more modulated acoustic carrier signals; filtering the one or more modulated acoustic carrier signals to remove any unintended audible harmonics created during modulation, including; equalizing the modulated acoustic carrier signal to pre-compensate for known degradations that will occur further along a signal path; setting a level of the modulated acoustic carrier signal for the intended application; and storing the modulated acoustic carrier signal in a buffer for subsequent output and transmission by the speaker.

25 Claims, 16 Drawing Sheets

Demodulation Signal Conditioning

(56) References Cited

U.S. PATENT DOCUMENTS

| | | | |
|---|---|---|---|
| 2005/0246747 A1 | 11/2005 | Braun et al. | |
| 2007/0211786 A1* | 9/2007 | Shattil | 375/141 |
| 2008/0039135 A1 | 2/2008 | Nakamura et al. | |
| 2008/0273644 A1* | 11/2008 | Chesnutt et al. | 375/370 |
| 2008/0306736 A1 | 12/2008 | Sanyal | |
| 2009/0041260 A1 | 2/2009 | Jorgensen | |
| 2009/0059903 A1 | 3/2009 | Kubler | |
| 2009/0076825 A1 | 3/2009 | Bradford | |
| 2009/0154603 A1 | 6/2009 | Li | |
| 2009/0156193 A1 | 6/2009 | Urbanija | |
| 2009/0169038 A1 | 7/2009 | Knudsen | |
| 2009/0305677 A1 | 12/2009 | Ellison et al. | |
| 2010/0119208 A1 | 5/2010 | Davis et al. | |
| 2012/0078702 A1 | 3/2012 | Rissanen | |
| 2013/0010979 A1 | 1/2013 | Takara | |

OTHER PUBLICATIONS

MetaMirror & The Future of TV, http://www.designbynotion.com/metamirror-next-generation-tv/, Aug. 5th, 2010.

Mozaik, http://mymosaic.net/www/icontent.php.

* cited by examiner

Encoding Process

Modulated Acoustic Carrier Signal 111

Decoder State Model

ACOUSTIC MODULATION PROTOCOL

CROSS-REFERENCE TO RELATED APPLICATIONS

This application claims benefit of priority to Provisional Patent Application 61/417,705 filed Nov. 29, 2010, and is related to patent application Ser. No. 12/870,767, filed Aug. 27, 2010, both assigned to the assignee of the present application, and incorporated herein by reference.

BACKGROUND

Over the years, technology has been developed for transmitting data over the air using an audio signal from a speaker. For example, Spot411 Technologies provides an iPhone application (app) for NBC Universal and 20th Century Fox that tap into DVD or Blu-ray discs to augment viewing. The app uses the microphone on the iPhone or a laptop, to “hear” the audio signal from the movie being played, then responds with pop-ups about the movie. It also intersects with Facebook and Twitter for movie chats. The app makes the DVD part of a networked experience. Universal’s Pocket Blu app is just for the iPhone and enables the iphone to act as a remote control for the movie if when played on a Blu-ray player (it currently doesn’t work with traditional DVDs or computers) and plays trailers for upcoming movies. Using the internal microphones of the device, 20th Century Fox’s FoxPop app listens and synchs up with the film, and then delivers random facts, trivia and behind-the-scenes details that pop up for the viewer at specific points throughout the film. The app can let a user leave a message for a friend who might watch the movie in the future.

Another example is ShopKick’s iPhone application that takes advantage of a smart phone’s microphone to bring location-sensing indoors, where GPS won’t work, for location-based shopping. Beacons smaller than a person’s hand fixed to a store’s ceiling beam out an inaudible ultrasound signal at a frequency that can be picked up by a cell phone’s microphone but not by human ears. The app decodes the signal and contacts ShopKick’s database to determine where the user is, and to retrieve some sort of reward for the user.

Neilson offers a service where data transmission via audio signals is used for video on demand reporting. A video on demand (VOD) Audience Measurement service enables content providers to insert a digital audio watermark into VOD content which is audible to Nielsen meters in homes.

Neilson also has personal meters, called “Go Meters,” that capture out-of-home viewing by collecting audio signatures. One device places metering technology in cell phones and the other is a customized meter that resembles an MP3 player. The Meters recognize when a show is playing, based on signals hidden in the audio. One method, called psychoacoustic encoding, injects a digital time stamp and program title—or “active signature”—into the audio tracks of TV shows as they are broadcast. Another technique, called passive signatures, creates a kind of audio fingerprint for TV shows; a split-second sample of audio is digitized, creating a unique signature, which also can be recognized by metering equipment.

The psychoacoustic encoding method relies on digital signals embedded in the audio of broadcast TV shows. These signals—which last for a fraction of a second—are slipped into the audio tracks of TV shows approximately every 2.5 seconds, except for periods of sustained silence. If heard, the encoded signals would be a crrrkkkkk kind of sound. While the codes themselves can be heard by the human ear, they are inserted into audio at points where they are imperceptible. TV networks and broadcasters use equipment called a NAVE (Nielsen Audio Video Encoder) to “burp” these signature codes into the program audio, which are picked up by devices installed in 40,000 viewer’s homes—the company’s statistical sample base. Called NP (Active/Passive) monitors, these cable-box-sized gadgets tie into the audio output of a TV or home theater system and actively decode and store the psychoacoustic signals.

Despite these advances in data transmission via audio, current technology has limitations that hamper widespread adoption. For example Spot411 works only with Blu-ray or DVDs (not broadcasts) and must use an audio signature of a movie to identify which movies is being played. The app must also first be synched with the movie.

Shopkick requires additional hardware—a separate speaker, to produce the acoustic signal, and determine the presence of the device running the Shopkick application. There is no transmission of any other audio signal besides the inaudible Shopkick signal.

The Neilson system is used to determine when a show is really viewed, vs. the time of its scheduled broadcast; the codes circumvent the problem of time-shifted viewing, because the audio burps also show up on recorded programs when played from a DVR hard drive or VCR tape. The signatures, however, are only used to ID broadcast programs from which the signatures were derived.

In addition, many prior art solutions are based on frequency shift keying (FSK) for modulation/demodulation, which has had limitations in an acoustic communications environment.

Accordingly, it would be desirable to provide an improved over air acoustic data communication method and system.

BRIEF SUMMARY

The exemplary embodiments provide a computer-implemented method for generating a modulated acoustic carrier signal for wireless transmission from a speaker of a transmit device to a microphone of a receive device. Aspects of the exemplary embodiments include converting a message to binary data; modulating one or more selected frequencies for one or more acoustic carrier signals based on the binary data to generate one or more modulated acoustic carrier signals; filtering the one or more modulated acoustic carrier signals to remove any unintended audible harmonics created during modulation, including; equalizing the modulated acoustic carrier signal to pre-compensate for known degradations that will occur further along a signal path; setting a level of the modulated acoustic carrier signal for the intended application; and storing the modulated acoustic carrier signal in a buffer for subsequent output and transmission by the speaker.

DETAILED DESCRIPTION

Figure 1:
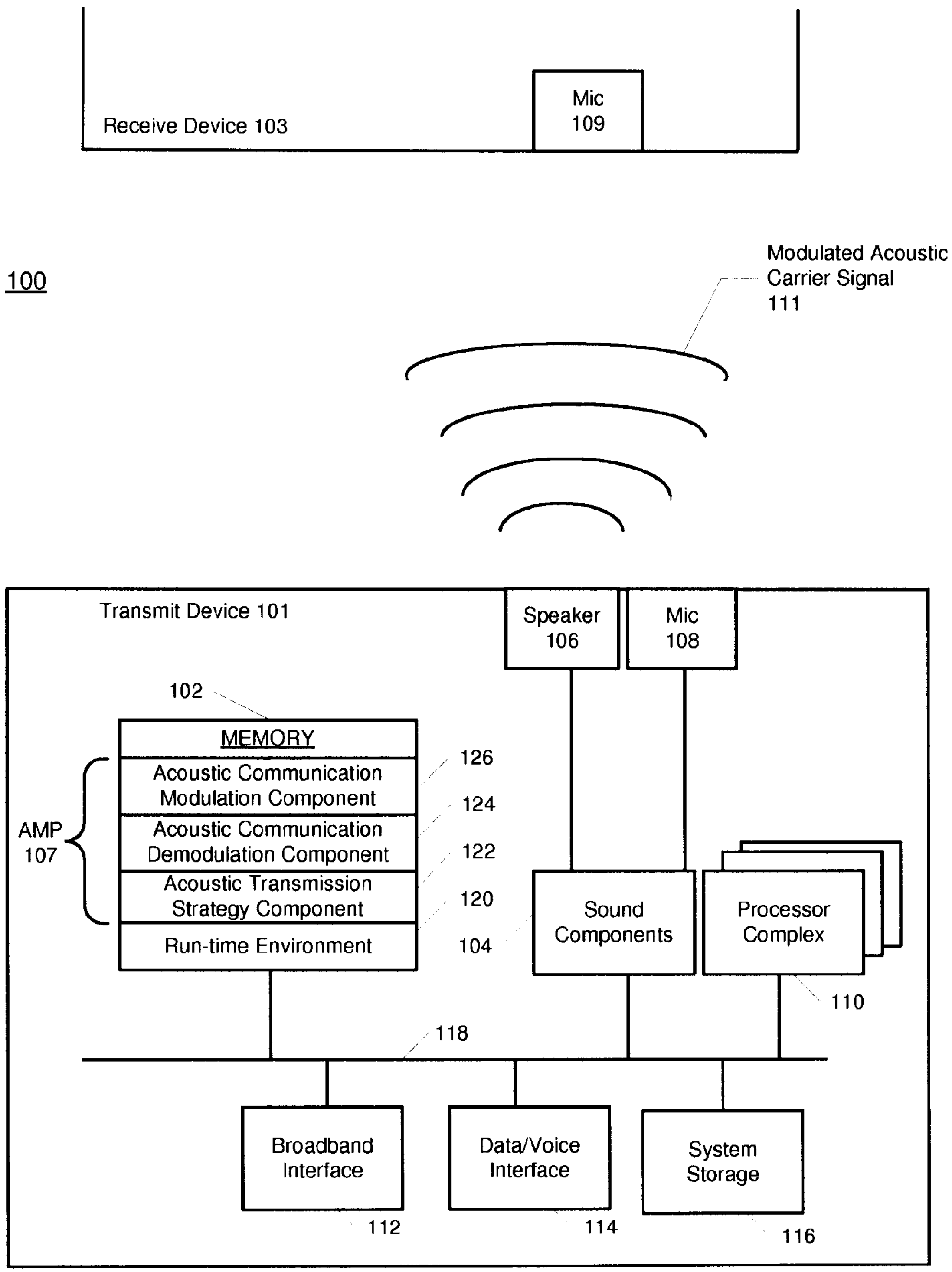
FIG. 1 is a block diagram illustrating an exemplary acoustics system in which the acoustic modulation protocol may be implemented.

The exemplary embodiment relates to an acoustic modulation protocol. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as “exemplary embodiment”, “one embodiment” and “another embodiment” may refer to the same or different embodiments. The embodiments will be described with respect to systems and/or devices having certain components. However, the systems and/or devices may include more or less components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

The exemplary embodiments provide an acoustic modulation protocol (AMP) for enabling transmission of a signal over an acoustics interface. The exemplary embodiments take advantage of existing sound components of a mobile device, such as a speaker, to encode digital data on an acoustic carrier signal using an acoustic modulation protocol. The acoustic carrier signal is sent over air where it is received by existing sound components of a receive device, such as a microphone, and decoded to recover the digital data using the acoustic modulation protocol. The resulting acoustic carrier signal with the encoded digital data supports numerous bitrates. The acoustic modulation protocol can be used for unidirectional or bidirectional data communication.

The acoustics modulation protocol of the exemplary embodiments enable two or more devices to communicate acoustically with one another without the need for specialized hardware (e.g., near field communication (NFC), global positioning system (GPS), Bluetooth (BT), chips, RFID tags, dongles, and the like) other than microphones and speakers found on most computers and portable devices. In one embodiment, the modulation techniques of the acoustics modulation protocol can be applied using any carrier frequency value, some of which may be audible (<20 kHz) or inaudible (>20 kHz). The choice of which carrier frequency to use may be dependent upon the user application, ambient noise conditions, and frequency response of the acoustic system.

FIG. 1 is a block diagram illustrating an exemplary acoustics system in which the acoustic modulation protocol may be implemented. The acoustics system 100 includes a transmit device 101 and a receive device 103. Transmit device 101 may include a memory 102, sound components 104 with speaker 106 and/or microphone 108, a processor complex 110, a broadband interface 112, data/voice interface 114 and system storage 116. Receive device 103 may include the same components, but the speaker may be optional. In one embodiment, one or both of the transmit device 101 and the receive device 103 may apply to any type of wireless phone, computer enabled devices (i.e., point-of-sale terminals, electronic billboards, kiosks) or general-purpose computers capable of performing acoustic communication in accordance with the present invention. To that end, transmit device 101 may also be broadly, and alternatively, referred to as a mobile device, wireless phone, smart phone, feature phone, computer, laptop computer, tablet or smart book. Moreover, various aspects of the invention may include the same or similar components despite the particular implementation illustrated in FIG. 1. For example, some implementations may use a central interconnect 118 for communication among the components while other implementations may use multiple direct paths between each of the components. Alternate embodiments may combine one or more of these components into a single component or may separate them into different combinations of components. Functionality provided by the transmit device 101 and receive device 103 may be implemented in hardware, software or in various combinations thereof depending on the design and implementation details.

In the illustrative implementation in FIG. 1, memory 102 includes storage locations that are addressable by the processor complex 110 and adapters for storing software program code and data. For example, memory 102 may comprise a form of random access memory (RAM) that is generally classified as “volatile” memory. Processor complex 110 and various adapters may, in turn, comprise processing elements and logic circuitry configured to execute the software code and manipulate the data stored in the memory 102. System storage 116 may be a form of non-volatile storage for storing a copy of run-time environment 120, applications and other data used by transmit device 101.

According to the exemplary embodiment, the transmit device 101 is enabled with an acoustic modulation protocol (AMP) 107. The acoustic modulation protocol (AMP) 107 may reside in memory 102 during run-time and may include an acoustic communication modulation component 126, an acoustic communication demodulation component 124, and an acoustic transmission strategy component 122.

Acoustic communication modulation component 126 includes functions and datasets that encode data and modulate it over acoustic transmission frequencies, creating a modulated acoustic carrier signal 111 in accordance with the exemplary embodiment. Likewise, acoustic communication demodulation component 124 includes functions and datasets necessary to demodulate data from modulated acoustic carrier signals 111 received over various acoustic transmission frequencies in accordance with AMP. Acoustic transmission strategy component 122 includes functions and datasets necessary for identifying the acoustic transmission frequencies and timing to transmit and receive data acoustically in accordance with aspects of the present invention. For example, acoustic transmission strategy component 122 may identify the acoustic frequencies for transmitting data and to determine an optimal time for acoustically transmitting the data. The receive device 103 may include the same AMP components, with the exception of the acoustic transmission strategy component 122 in an embodiment where receive device 103 itself does not transmit a modulated acoustic carrier signal 111.

Memory 102 may also include run-time environment 120 portions of which typically reside in memory and are executed by the processing elements. Run-time environment 120 may be based upon a general-purpose operating system, such as Linux, UNIX® or Windows®, the Apple OS® or any other general-purpose operating system. It may also be based upon more specialized operating systems such as the Blackberry Operating system from RIM, Inc., the Symbian OS from Nokia, Inc., the iPhone OS or iOS from Apple, Inc., the Android operating system from Google, Inc. of Mountain View Calif., the Web OS or HP Web OS from Hewlett Packard Co. or any other operating system designed for the mobile market place.

Sound components 104 include codecs and other components for converting sound transmitted through microphone 108 into a digital format such as PCM (pulsecode modulation). These codecs are also capable of converting the digital information back into an acoustic analog signal and then broadcasting through speaker 106.

Processor complex 110 may be a single processor, multiple processors or multiple processor cores on a single die. It is contemplated that processor complex 110 represents the one or more computational units available in transmit device 101. Processor complex 110 may also be a physical aggregation of multiple individual processors that each individually process and transfer data over interconnect 118. Alternate implementations of processor complex 110 may be a single processor having multiple on-chip cores that may partition and share certain resources also on the processor die such as L1L2 cache. For at least these reasons, aspects of the exemplary embodiment may be described as using a processor or multiple processors for convenience, however, it is contemplated that the term "processor" could also be applied to designs utilizing one core or multiple cores found on a single chip or die. Likewise, the term process is used to describe the act of executing a set of related instructions on one or several processors but it is also contemplated that alternate implementations could be performed using single or multiple threads executing the same or similar instructions on one or several processors each capable of multi-threaded execution.

Broadband interface 112 may be a WiFi, WiMAX or other connection to a network such as the Internet. The broadband interface 112 may also include wired connections to the Internet using CAT 5/6, Fiber Channel or similar methods. Data/voice interface 114 includes functions and datasets for transmitting data and voice over a wireless network. Protocols used for data/voice interface 114 may include one or more of GSM, CDMA, TDMA, FDMA or other wireless protocols. The data portions of data/voice interface 114 may carry data at 2G, 2.5G, 3G, 4G and beyond implemented using various wireless protocols including EDGE, EV-DO, HSPA, and others.

System storage 116 may include an area for storing applications, operating system portions, and data. It is contemplated that system storage 116 may be on a removable SD (secure digital) storage or other similar device and that the SD storage may include security features for holding critical pieces of information such as credit card numbers and other similar information. Alternatively, system storage 116 may include conventional magnetic tapes or disks, optical disks such as CD-ROM, DVD, magneto optical (MO) storage or any other type of non-volatile storage devices suitable for storing large quantities of data. These latter storage device types may be accessed locally through a direct connection or remotely in the "cloud" through broadband interface 112 or data/voice interface 114 type network connections.

While examples and implementations have been described, they should not serve to limit any aspect of the exemplary embodiments. Accordingly, implementations of the exemplary embodiments can be implemented in digital electronic circuitry, or in computer hardware, firmware, software, or in combinations of them. Apparatus can be implemented in a computer program product tangibly embodied in a machine readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high level procedural or object oriented programming language, or in assembly or machine language if desired; and in any case, the language can be a compiled or interpreted language. Suitable processors include, by way of example, both general and special purpose microprocessors. Generally, a processor will receive instructions and data from a read only memory and/or a random access memory. Generally, a computer will include one or more mass storage devices for storing data files; such devices include magnetic disks, such as internal hard disks and removable disks; magneto optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto optical disks; and CD ROM disks. Any of the foregoing can be supplemented by, or incorporated in, ASICs.

Figure 2A:
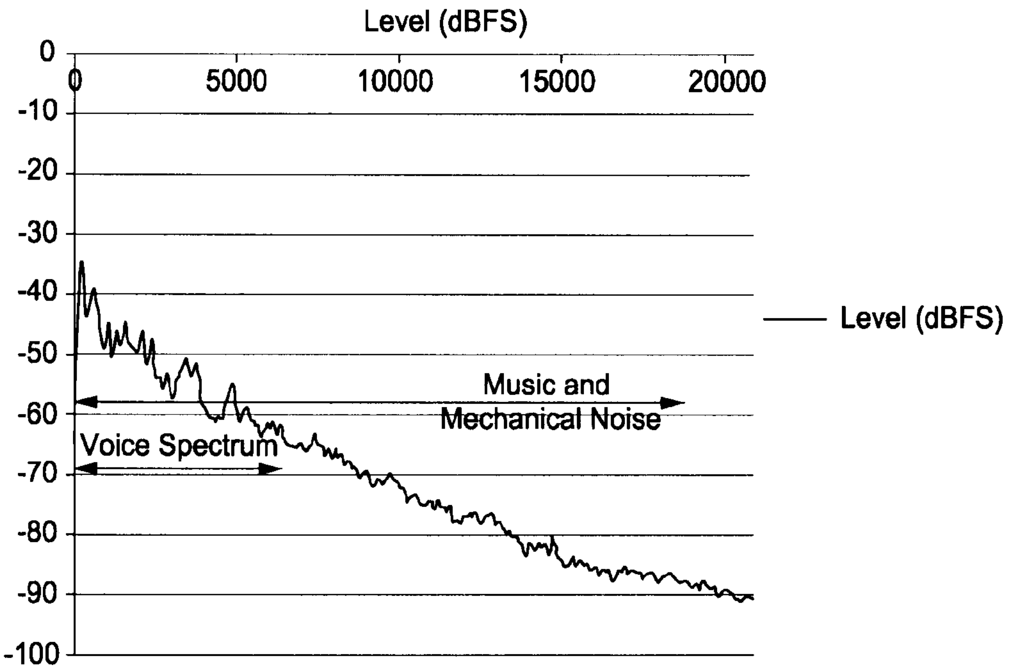
FIG. 2A is a graph illustrating a typical noise spectrum as measured by the receive device microphone.
Figure 2B:
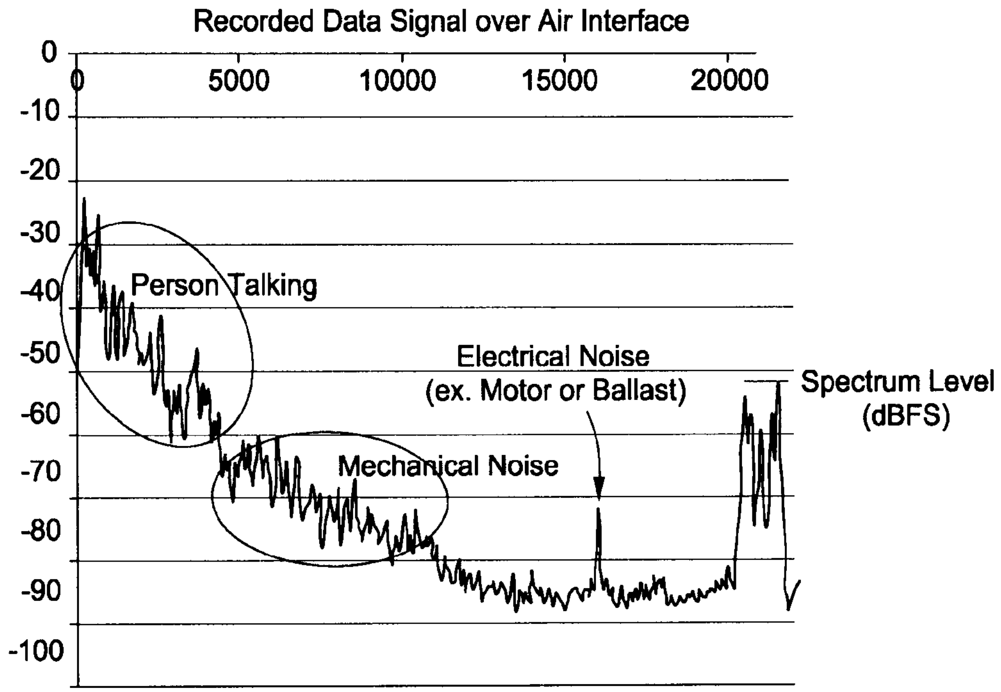
FIG. 2B is a graph illustrating levels of the modulated acoustic carrier signal wirelessly received over the air at various frequencies versus noise levels.

When transmitting modulated acoustic carrier signal 111, the receive device 103 may encounter noise and signal degradation as measured from the receive device microphone 109, as shown in FIGS. 2A-2B.

FIG. 2A is a graph illustrating a typical noise spectrum as measured by the receive device microphone. FIG. 2B is a graph illustrating levels of the modulated acoustic carrier signal 111 wirelessly received over the air at various frequencies versus noise levels. The x-axis in both Figures represents frequencies from 0 to 22,000 hertz, and the y-axis represents noise level in decibels relative to a full scale digital signal (dBFS). As shown in FIG. 2B, in one aspect of AMP 107, the modulated acoustic carrier signal 111 is transmitted at an inaudible acoustic frequency above 20,000 Hz, bringing modulated acoustic carrier signal 111 significantly above noise levels at those frequencies.

Referring again to FIG. 1, noise may originate from several sources in the acoustics system 100 including the sound components 104 (e.g., digital-to-analog converter, analog electrical circuit, and speaker transducer), and a mechanical housing of the transmit device 101, the air medium; and sources on the receive device 103 including mechanical housing and sound components such as the microphone transducer, analog-to-digital converter, and associated electrical circuitry. Each of these segments of the acoustic system will transform the modulated acoustic carrier signal 111 in some way. These transformations could be considered a degradation of the intended signal. Possible artifacts may include: amplification or attenuation, alteration of the frequency response, adding noise (thereby reducing SNR), adding distortion, or altering the phase.

Figure 2C:
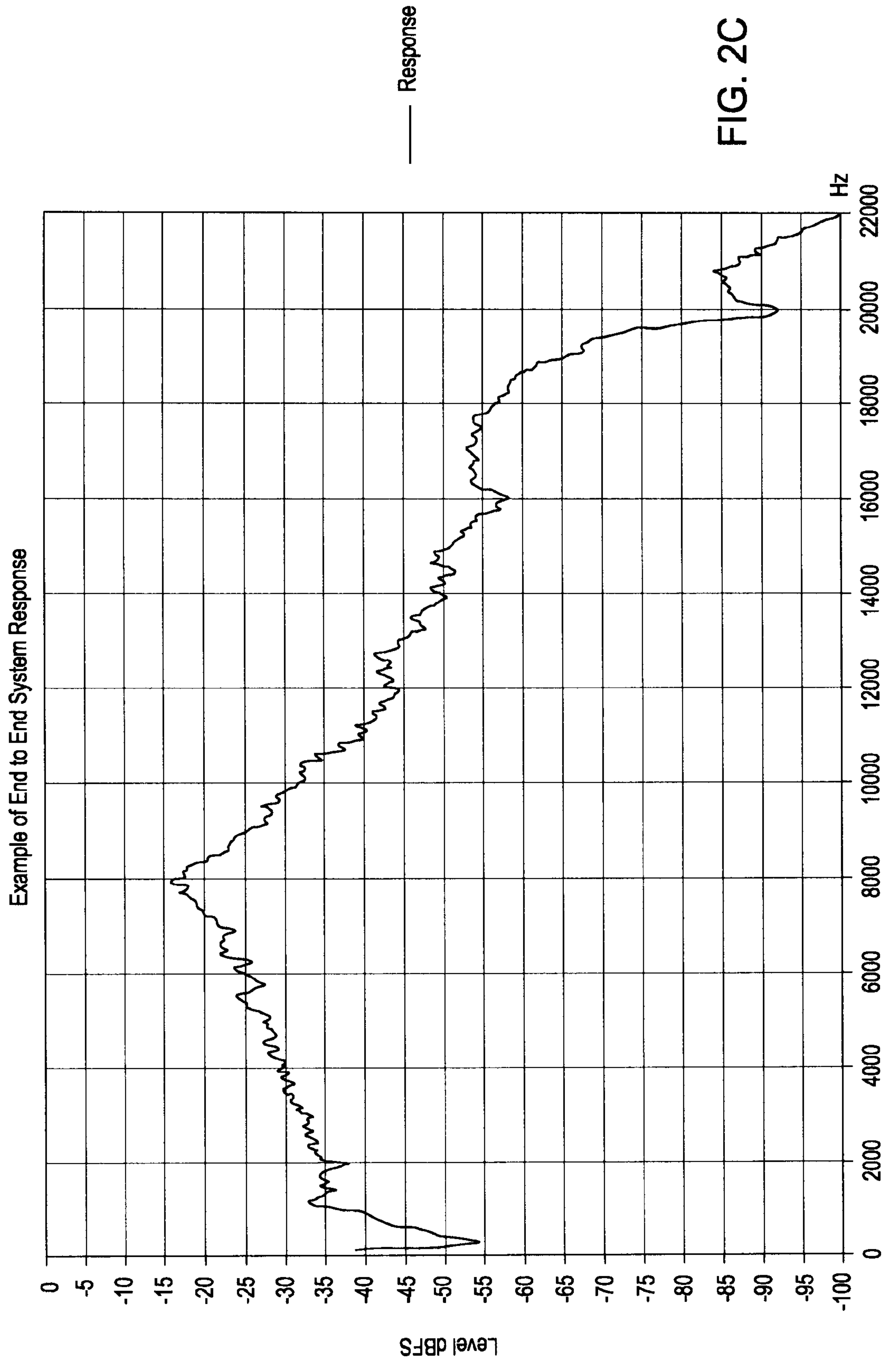
FIG. 2C is a graph depicting an end-to-end system response.

FIG. 2C is a graph depicting an end-to-end system response, where the x-axis represents frequencies from 0 to 22,000 hertz, and the y-axis represents the system response in dBFS (−15 to −90). In accordance with an exemplary embodiment, the acoustic modulation protocol 107 enables a decode process on receive device 103 to compensate for an overall transfer function shown in FIG. 2C. In accordance with an exemplary embodiment, the acoustic modulation protocol 107 may use a combination of filtering, dynamic gain, frequency equalization, frequency domain amplitude normalization, and statistical analysis to compensate for these degradations.

Figure 3:
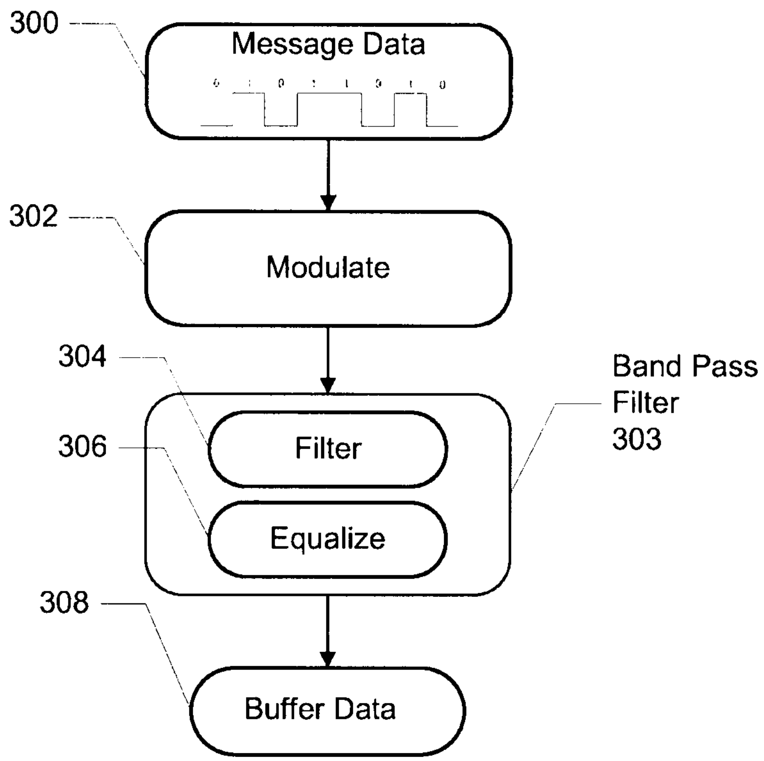
FIG. 3 is flow diagram illustrating a process for generating a modulated acoustic carrier signal for wireless transmission from a speaker of a transmit device to a microphone of a receive device.

FIG. 3 is flow diagram illustrating a process for generating a modulated acoustic carrier signal for wireless transmission from a speaker of a transmit device to a microphone of a receive device. In one embodiment, the process is performed by the acoustic communication modulation component 126. The process may begin with a message that is converted to binary data (step 300). In one embodiment, no limitations or restrictions are placed on message length.

In one embodiment, the message may include an AMP ID. In one embodiment, the AMP ID is a unique identification string that serves as a reference pointer to a larger data set stored in the receive device 103 or remote therefrom, and is associated with the transmit device 101 and/or the user of the transmit device 101. On the receive device 103, the AMP ID could be a command to enable a certain mode or feature (e.g., turn on a camera, play a sound file, connect to a WIFI SSID, etc). Alternatively, the receive device 103 could use the AMP ID to access a database on a computer server or Internet. In one embodiment, the AMP ID may comprise credentials that enable the receive device 103 to access an account and perform various services such as financial transactions, file sharing, or information exchange, for example.

The binary data is then used to modulate one or more selected frequencies for one or more the acoustic carrier signals to generate one or more modulated acoustic carrier signals 111 (step 302). In one embodiment, the frequency may be selected by the acoustic transmission strategy component 122. In one embodiment, the frequency selected is the highest frequency available in the acoustic system 100. In most acoustic systems 100, this represents a frequency around 20 kHz. In any event, a sufficiently high frequency may be selected so that the modulated acoustic carrier signal 111 is inaudible to humans. In an alternative embodiment, an acoustic carrier signal frequency may be chosen within the audible band, e.g., less than 20 kHz.

In one embodiment, the acoustic modulation protocol maps the binary values of 0 and 1 to specific frequencies. This is similar to a frequency shift key scheme, though AMP specifically utilizes continuous phase deviation to achieve the alternating frequencies. The resulting signal is without discontinuities as this may result in audible pops or clicks. For inaudible operation, a binary value of 0 may be represented by a 21000 Hz frequency and a binary value of 1 may be represented by a 20000 Hz frequency.

According to one aspect of the exemplary embodiment, the modulated acoustic carrier signal 111 is then passed through a filter 303 to remove any unintended audible harmonics created during modulation (step 303). In one embodiment, the filter 303 may comprise a Finite Impulse Response (FIR) filter (e.g., band pass) or an Infinite Impulse Response (IR) filter. In one embodiment where an acoustic carrier signal frequency is chosen within the audible band, a band pass filter may be used to filter the modulated acoustic carrier signal 111 to reduce audibility of the modulated acoustic carrier signal 111 (step 304). Since a digital signal has a fixed amount of headroom before clipping will occur, filtering the signal to pass only the intended frequencies allows the signal to be amplified to the maximum value.

The filter 303 may then be used to equalize the modulated acoustic carrier signal to pre-compensate for known degradations that will occur further along a signal path (step 306). The filtered and equalized modulated acoustic carrier signal is then stored in a buffer for subsequent output and transmission by the speaker transducer (step 308). For an embodiment specific to secure data transfer, the system may adjust a level of the signal stored in the buffer for an intended application, e.g., to prevent unintended demodulators from receiving the signal. Alternatively this may be accomplished by setting a volume of the transmit device 101 to a desired level. For instance, to ensure the data transmission is received only within a 10 cm range, the level output from the speaker may be set to 10% of maximum. Thus, the level of the source digital may be adjusted, or the speaker volume may be adjusted using the volume control on the Codec.

In a further embodiment, the transmit device 101 may use an onboard microphone to measure and analyze the ambient acoustic environment for ambient noise, audio interference, or self calibration. Self calibration could use a microphone on the transmit device 101 to measure the transmitted acoustic carrier signal and adjust the output level to meet a desired level. Based on the analysis, the AMP or other control logic could set the speaker level to a higher setting (louder) to overcome ambient noise and/or switch the carrier frequency to minimize the audio interference.

Figure 4:
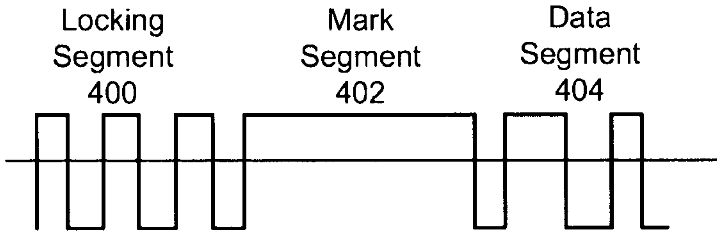
FIG. 4 is a block diagram illustrating components of the modulated acoustic carrier signal according the AMP.

FIG. 4 is a block diagram illustrating components of the modulated acoustic carrier signal 111 according the AMP. In one aspect of exemplary embodiment, the modulated acoustic carrier signal 111 may include a locking segment 400, a mark segment 402, and a data segment 404.

The locking segment 400 enables the acoustic communication demodulation component 124 or decoder in the receive device 102 to determine the receiving signal frequencies. The locking segment 400 allows the receive device 103 to ignore irrelevant signals in the same audio band as well as equalize its frequency detection channels. It is here also where the receiving signal frequencies may be determined. In one embodiment, the locking segment may include approximately 30 transitions of mark to space.

The mark segment 402 may be used to reset data reception parameters (buffers are cleared) and prepare for the reception of the data, looking for a start-bit. Data alignment begins following the mark segment 402. The mark segment may include approximately 10 bit periods in one embodiment. Data alignment may be adjusted to begin at the first start bit after the mark segment 402.

The data segment 404 may comprise 2 to N words of data followed by a cyclic redundancy check, CRC (not shown). In one embodiment the CRC may be 1-byte (not shown) that ensures data integrity. Another embodiment using a simpler data integrity check method could employ a checksum.

The acoustic system 100 may be configured to transmit the modulated acoustic carrier signal 111 at rates such as 100, 300, and 1200 bps, for example. The acoustic system 100 may be adapted to run at any rate.

The modulated acoustic carrier signal 111 is inaudible when the modulated acoustic carrier is above 20 khz. The acoustic system 100 can also operate below these sampling rates as long as the modulated acoustic carrier signal 111 frequencies are adapted to be below the Nyquist rate of the codec.

The modulated acoustic carrier signal 111 comprises two frequencies, though only one frequency is being generated at a given time instant. The lower frequency may represent a mark "1" and the higher frequency may represent a space "0". There is an option to have no signal for the space as well.

According to one aspect of the exemplary embodiment, construction of the modulated acoustic carrier signal 111 can be generalized to include more than 2 frequencies. The additional frequency components can be used as a parallel data path, a bidirectional data path, redundancy, control, or framing, for example.

Another embodiment may construct multiple (e.g. N) acoustic carrier signals separated by a suitable frequency guard band, 500 Hz for example. The additional acoustic carrier signals can be modulated forming a parallel data transmission. The N additional parallel acoustic carrier signals may be used to effectively multiply a base data rate by N. Alternatively, these additional parallel acoustic carrier signals could form redundant data paths, thereby reducing the chance of bit errors. For this embodiment, the receive device 101 would have multiple decoders operating in parallel. A band pass filter tuned for each decoder carrier frequency would block the other data transmissions bands from affecting the demodulation process.

The locking segment 400 of the modulated acoustic carrier signal 111 starts with a mark signal. This is created by generating a cosine waveform of fixed amplitude with no phase and then adjusting the phase for the appropriate sampling frequency. The cosine waveform value may be 0 value at t=0. When the signal switches from a mark to a space, the software may deviate the phase to adjust the frequency without zeroing the phase. The result is phase coherence for the modulated acoustic carrier signal 111. Phase coherence ensures harmonic artifacts are kept to a minimum, thereby placing less stringent requirements on subsequent filtering to keep the acoustic signal inaudible.

If the transmitting device acoustic system response is known through prior testing or self calibration, the modulated acoustic carrier signal 111 can be pre-compensated to offset the effects. Equalization during the signal generation phase can be used to compensate if for instance, the speaker transducer has a lower sound pressure output level at the desired carrier frequency than it does at lower frequencies.

Figure 5:
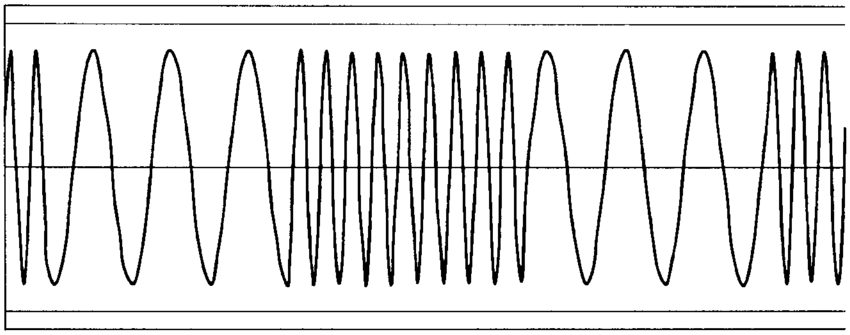
FIG. 5 is a graph illustrating an example of a modulated acoustic carrier signal having phase coherent transitions.

FIG. 5 is a graph illustrating an example of a modulated acoustic carrier signal having phase coherent transitions. The graph shows two distinct frequencies, which represent the binary data. The signal smoothly transitions between frequencies with no discontinuities. To reduce the phase distortion, when the modulated acoustic carrier signal 111 comprises two or more different frequencies, the change in frequency is performed while maintaining a constant phase relationship. In maintaining this constant phase, the harmonic artifacts of the generated signal is kept to a minimum.

The following equation defines the modulated signal.

$$y[n]=A*\cos(\phi_{[n-1]}+n*\Delta P_{f1})$$

$$y[n]=A*\cos(\phi_{[n-1]}+n*\Delta P_{f2})$$

Where:

y[n] is the current signal value,

A is the signal amplitude, $\phi$ is the phase, $\Delta P$ is a phase modifier deltaPhase, $2*\pi/f_s$ f1 is the frequency value for a Mark, and f2 is the frequency value for a Space.

During frequency transition (i.e., from mark to space) the deltaPhase will change to match the desired frequency. Within a bit period, the deltaPhase is constant.

Figure 6:
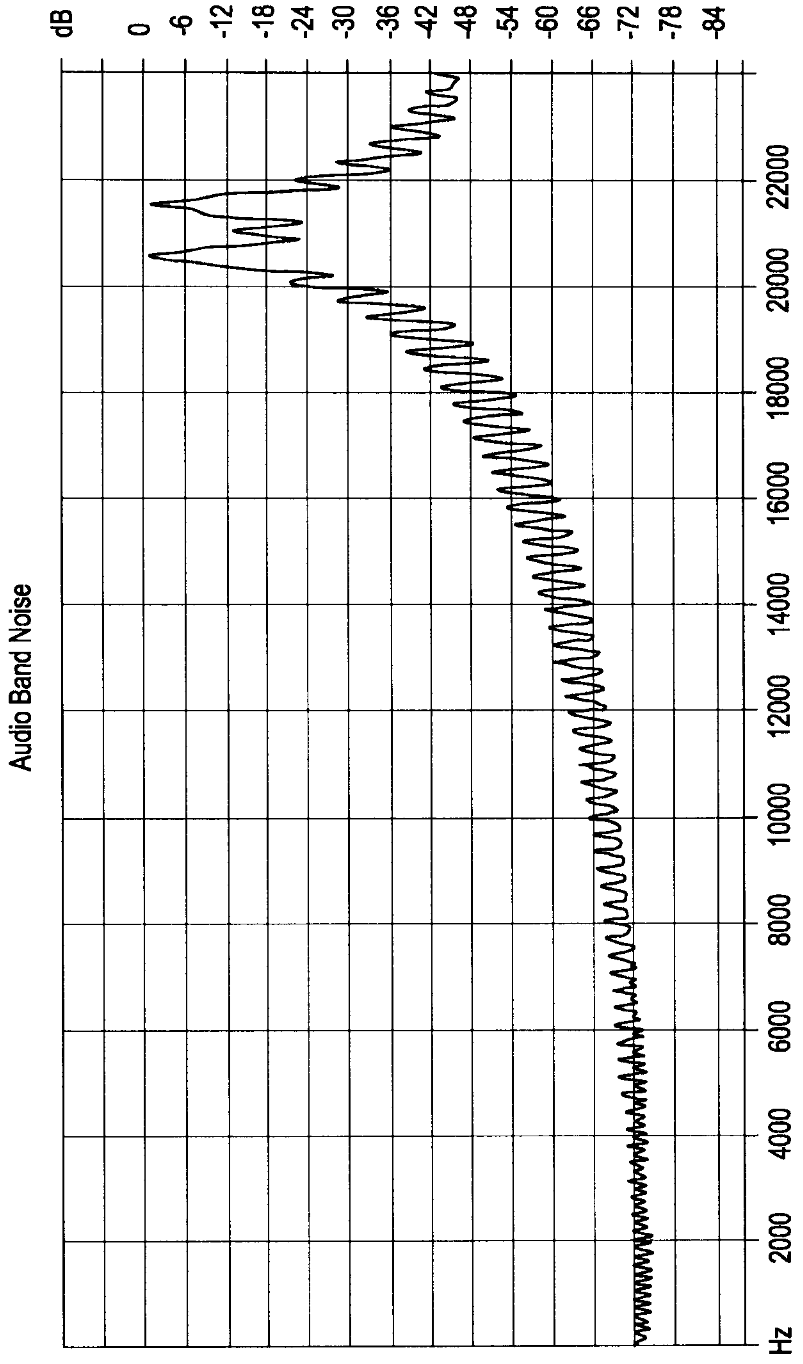
FIG. 6 is a graph showing frequency spectrum and harmonic artifacts of the modulated acoustic carrier signal before filtering.

The modulated acoustic carrier signal 111 generated before filtering may be highly audible even in the upper bands due to the number of harmonics generated as shown in FIG. 6. It should be noted that the audible part of the transmitted modulated acoustic carrier signal 111 is due to the transition of the signal from one frequency to another, which causes harmonic artifacts, as shown in FIG. 6.

FIG. 6 is a graph showing frequency spectrum vs. level of the data signal and harmonic artifacts of the modulated acoustic carrier signal before filtering. The harmonic artifacts can be within the range of human hearing. For the ultra-hi region e.g., 20 kHz or more, the two frequency components used to generate the signal are out of the range of human hearing.

Figure 7:
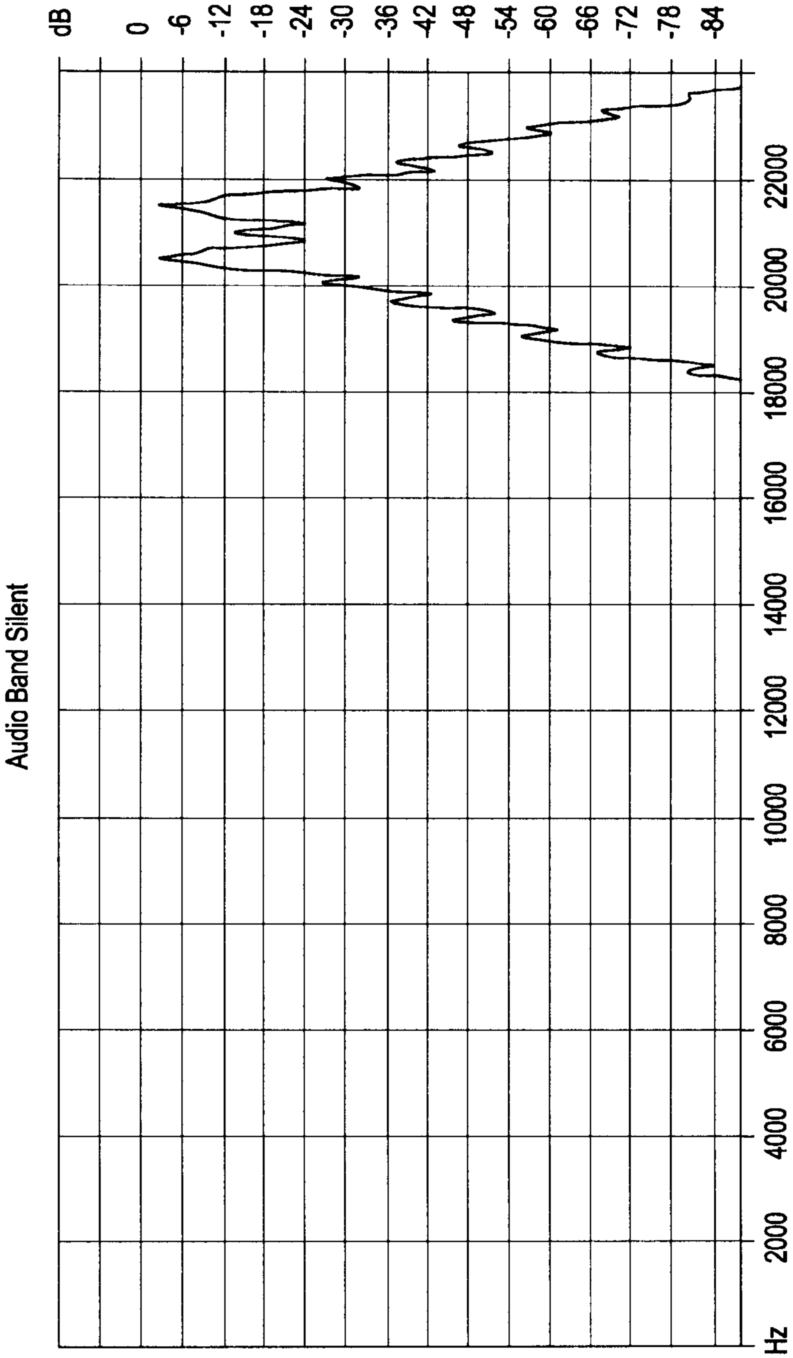
FIG. 7 is a graph showing the frequency spectrum of the modulated acoustic carrier signal after filtering.

FIG. 7 is a graph showing the frequency spectrum of the modulated acoustic carrier signal after filtering. In one embodiment, an order 80 band pass FIR (finite impulse response) filter may be used for each band to reduce the audibility of each generated modulated acoustic carrier signal 111 and for the ultra-hi region, renders the modulated acoustic carrier signal 111 virtually inaudible. For bands below 20 kHz, filtering renders the modulated acoustic carrier signal 111 less-audible.

Figure 8A:
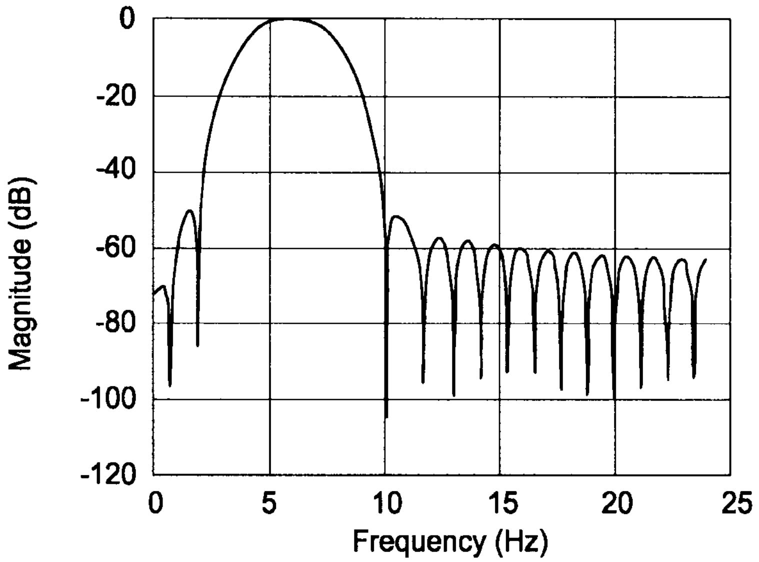
FIGS. 8A-8H are graphs illustrating example filter responses.
Figure 8B:
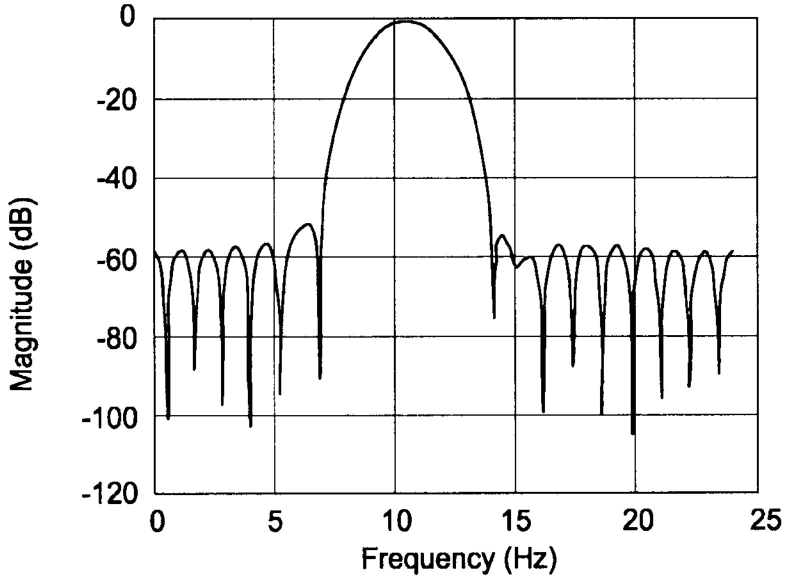
Figure 8C:
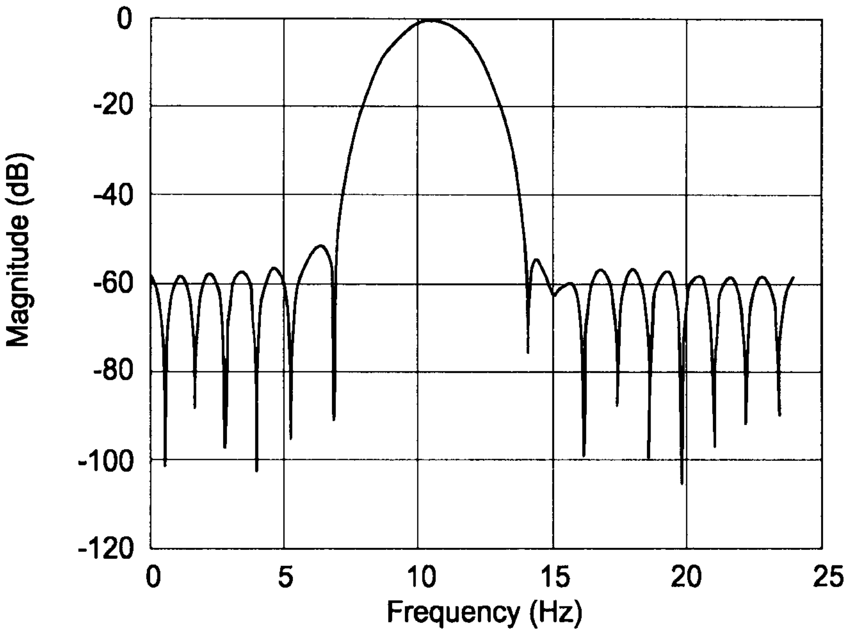
Figure 8D:
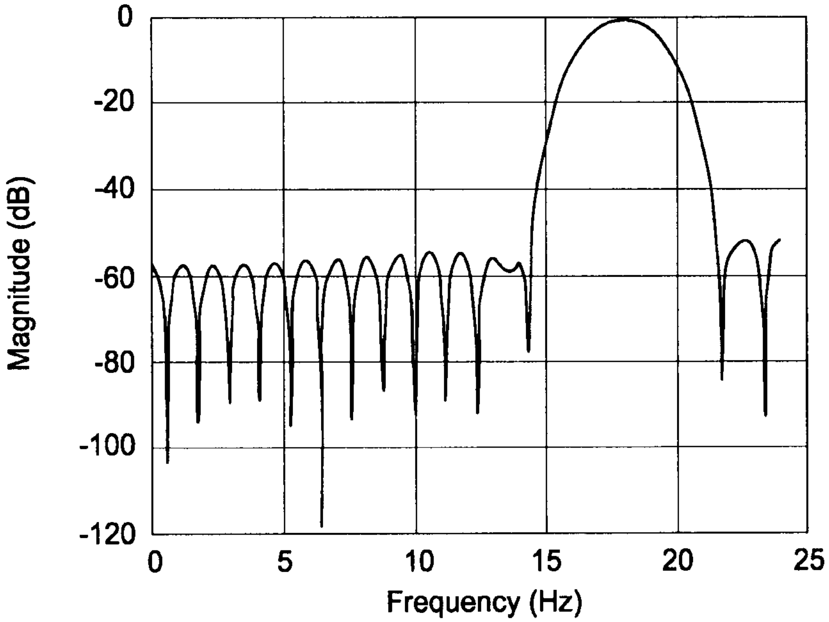
Figure 8E:
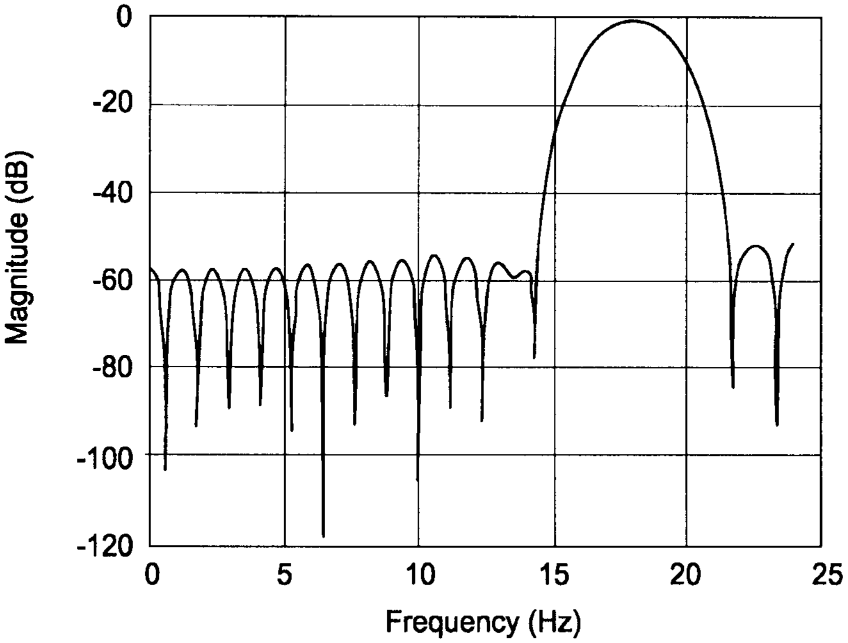
Figure 8F:
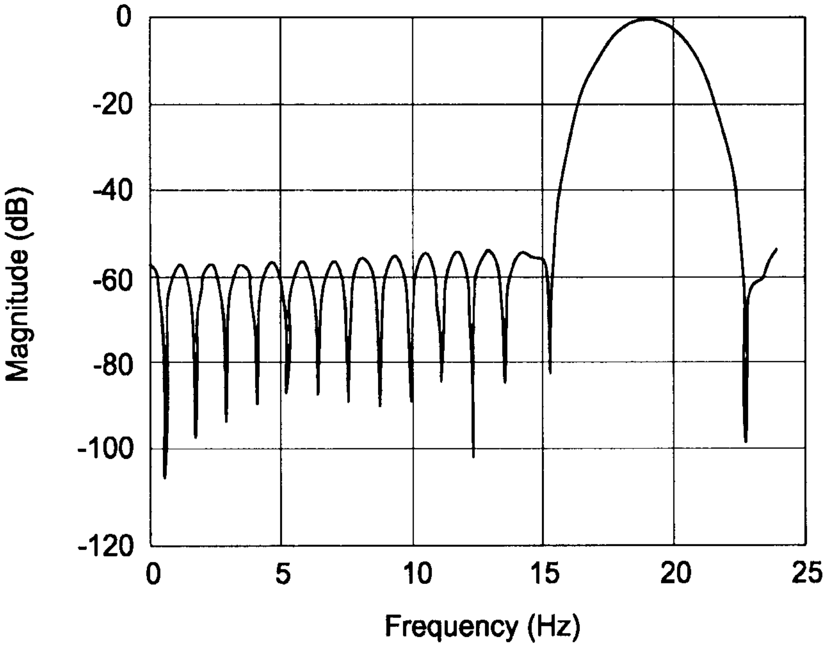
Figure 8G:
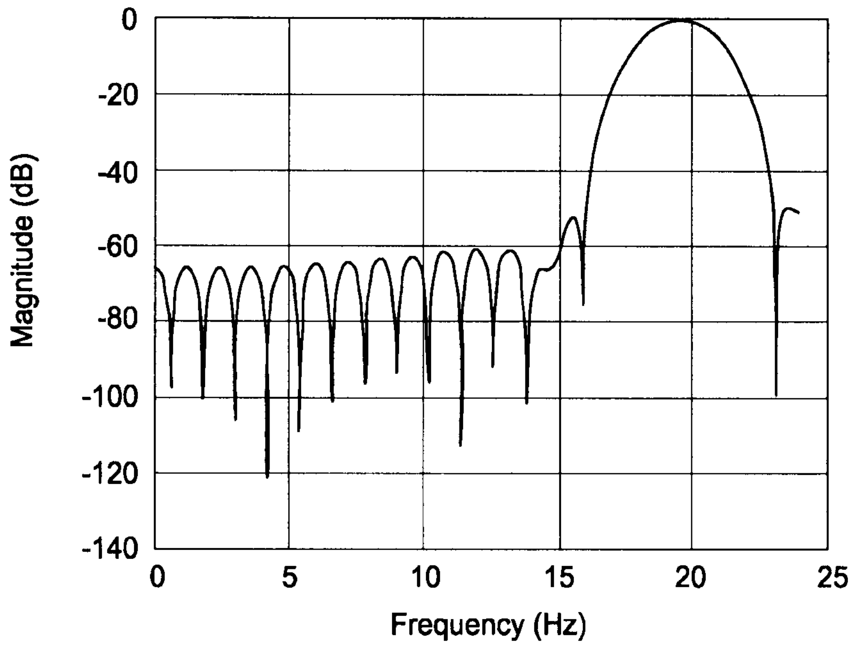
Figure 8H:
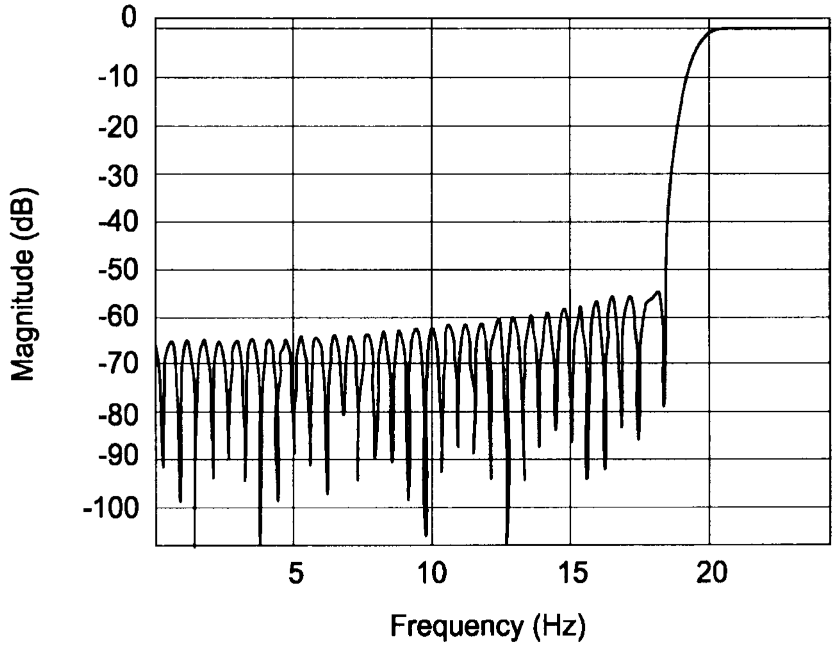

Band pass filtering may be used to perform the filtering and equalization tasks for AMP 107. Example filter responses are shown in FIGS. 8A-8H. FIG. 8A is a graph showing filter responses for a 5000 Hz band. FIG. 8B is a graph showing filter responses for a 10,000 Hz band. FIG. 8C is a graph showing filter responses for a 15,500 Hz band. FIG. 8D is a graph showing filter responses for an 18,000 Hz band. FIG. 8E is a graph showing filter responses for a 19,000 Hz band. FIG. 8F is a graph showing filter responses for a 20,000 Hz band. FIG. 8G is a graph showing filter responses for a 20,500 Hz band. FIG. 8H is a graph showing filter responses for a 21,000 Hz band.

The graphs of FIG. 8A-8G show the response of various band pass filters. The main wide lobe represents frequencies that will pass through the filter without gain modification. These signals have 0 dB of attenuation. On either side of the main lobe are frequencies that will be attenuated by 60 dB or more. FIG. 8H is an example of a high pass filter, in which all frequencies below the corner are attenuated, and all frequencies above are passed through unmodified.

As stated above, for transmission of the modulated acoustic carrier signal 111, a band pass filter may be used to reduce or eliminate audibility. To aid the decoder of the receive device 103 in detecting the modulated acoustic carrier signal 111, the band pass filter may also be used in the receive device 103 to eliminate out-of-band signals, and improve signal-to-noise ratio. Elimination of out of band signals also aids the decoder in determining a current signal level within the data band. Low level frequency noise could dominate this measurement otherwise.

The 80-tap band pass FIR (finite impulse response) filter in the transmit device 101 and the receive device 103 may be created with several Matlab scripts. The band pass filters may comprise a combination of a low pass FIR filter and a high pass FIR filter of lower order. The filter creation steps are outlined below.

First, the high pass filter can be created so that the lowest signaling frequency has no attenuation when the filter is applied. The low pass filter is created so that the highest signaling frequency has no attenuation when the filter is applied. Since the number of taps is limited and some of the frequencies are close to the Nyquist sampling rate, the filter design process can become iterative due to limit cycles.

Next, the high pass and low pass filters may be combined. This step is performed by convolving the two filters to create a super-filter with the band pass frequency response desired.

Filtering is performed as ongoing process and as the filtering methodology evolves for AMP 107, a more complex frequency response may be used.

Since the AMP 107 algorithm can run at different sampling rates, filters from 48000 Hz sampling to the other sampling rates may be used. In one embodiment, the filters can be scaled to also run at 44100 Hz.

Performance enhancement may prove that higher order filters are better. The AMP implementation is not tied to the filters described herein. Filters may provide adequate audio performance, but as the AMP is enhanced, the filters may become more complex.

In an alternative AMP 107 embodiments, existing FIR filters may be converted to HR (infinite impulse response) filters. The same level or better frequency roll-off can be achieved with IIR filters as opposed to FIR filters. Also, the same order filtering can be achieved with a much reduced CPU load. The FIR filters may be chosen to simplify designs early on when the may filters change rapidly. In an exemplary embodiment, an Elliptic IIR may be used.

Signal Reception at the Receive Device 103

Detection of the modulated acoustic carrier signal 111 at the receive device 103 requires precision signal detection and frequency discrimination. This detection may be performed on audio samples shorter than the bit period and then bits are re-assembled in a manner so that a signal detection state machine in the acoustic communication demodulation component 124 can appropriately construct the final data message.

Figure 9:
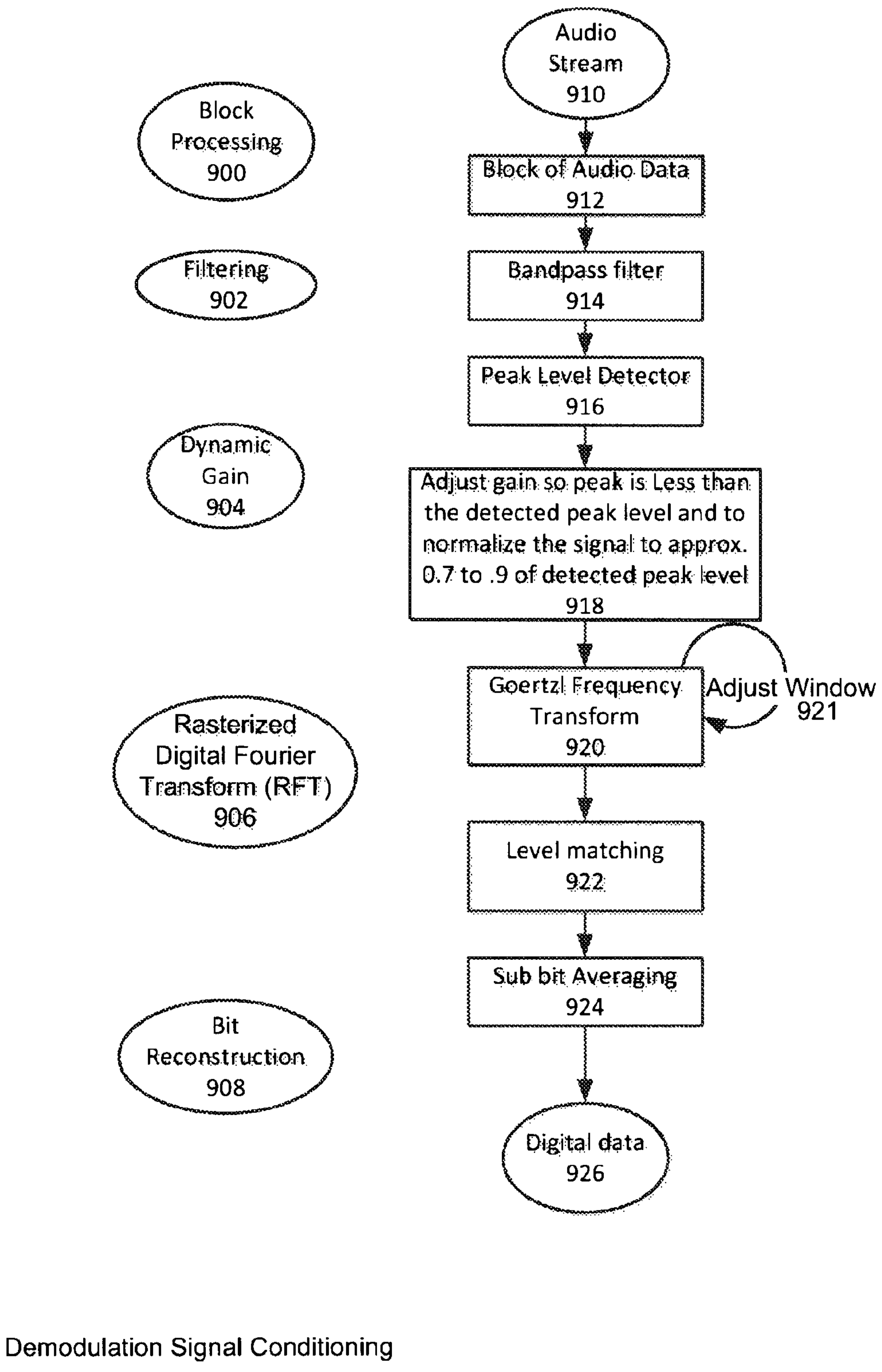
FIG. 9 is a block diagram illustrating a process for demodulating the modulated acoustic carrier signal according to one embodiment.

FIG. 9 is a block diagram illustrating a process for demodulating the modulated acoustic carrier signal according to one embodiment. In this embodiment, the process of performed by the acoustic communication demodulation component 124 in the receive device 103. In another embodiment, the demodulation process may occur remote from the receive device 103, e.g. by a remote server. In one embodiment process may include the following high-level steps: block processing 900, filtering 902, dynamic gain 904, Rasterized Digital Fourier Transform (RFT) 906, and bit reconstruction 908.

The block processing 900 may include the sound components of the receive device 103 receiving the modulated acoustic carrier signal 111 as an audio stream (step 910), and the acoustic communication demodulation component 124 receiving data in blocks from one or more buffers of the sound components (step 912). The data blocks can be as large at several seconds to as small as a fraction of a second. The blocks are determined to minimize detection time without exceeding the real-time processing limits of the system. In one embodiment, a 1-second buffer size may be used to meet real-time performance. Longer buffer uses more memory, shorter buffer results in higher CPU load due to more memory movements.

After detection of the modulated acoustic carrier signal 111, filtering is performed to eliminate out of band signals and improve signal to noise ratio (Step 914). Filtering also increases the performance of the dynamic gain step which follows, since out of band signals will no longer influence the analysis. A band pass filter comprising a combination of lowpass and highpass FIR filters of lower order may be used. For example, an 80 tap band pass FIR filter may be created using Matlab. The filters may be designed such that the signaling frequencies have no attenuation, meaning the 3 dB bandwidth of the band pass filter is wider than the signaling spectrum.

After the modulated acoustic carrier signal 111 is filtered, the level of the modulated acoustic carrier signal 111 is dynamically adjusted to provide a substantially constant power level for the modulated acoustic carrier signal 111 for a subsequent frequency analysis performed by the RTF 906 (Step 904). The amplitude of the modulated acoustic carrier signal could have large variance due to unknown and variable distances across the air interface (whereas data transmission across a wireline will be maintained at standard levels). Sound pressure attenuates inversely to square of the distance (1/(r^2). Since generally one side of the system is in a non-fixed position (hand-held systems) though both side could be hand held devices, the distance between transmit and receive devices 101 and 103 can vary throughout the data transmission period. The dynamic gain stage automatically compensates for this attenuation. Careful attention to the prevention of signal clipping is a concern. Accordingly, in one embodiment, the dynamic gain algorithm may comprise the following.

First, the acoustic communication demodulation component 124 in the receive device 103 detects a peak level of the modulated acoustic carrier signal 111 within a buffer window (step 916). This helps determine the headroom available for gain addition to other lower signals.

Next, the acoustic communication demodulation component 124 adjusts the gain of the modulated acoustic carrier signal 111 by so that an adjusted peak of the modulated acoustic signal carrier 111 is less than the detected peak level, and to add gain to the modulated acoustic carrier signal 111 so that the power level of the modulated acoustic carrier signal 111 is normalized to approximately 70% to 90% of the detected peak level (step 918). Gain needs to be applied in a manner that does not introduce non-linearity (non-zero crossing) or distort the phase relationship. Gain may be applied on a per buffer basis to minimize phase distortion. Gain may be bounded by the level found during absolute peak detection.

Figure 10A:
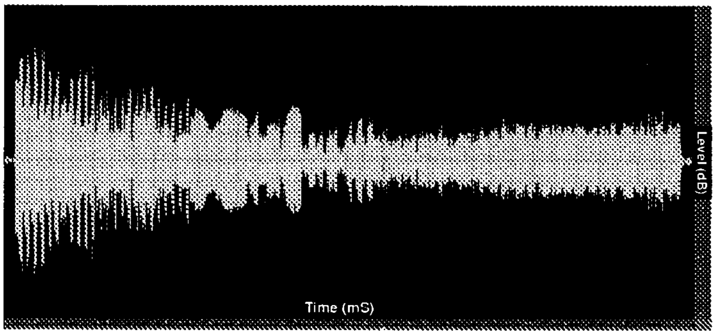
FIG. 10A is a graph showing an energy envelope of the received modulated acoustic carrier signal.
Figure 10B:
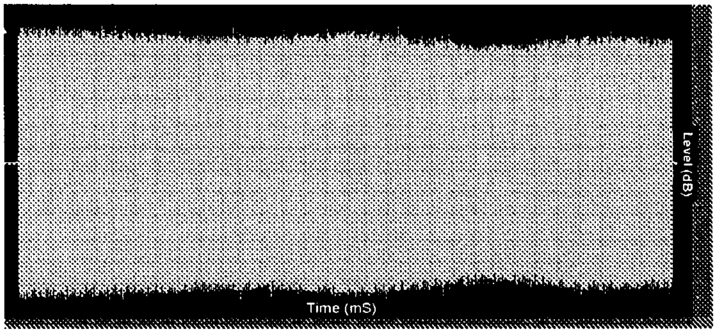
FIG. 10B is a graph showing the energy envelope of modulated acoustic carrier signal after the dynamic gain stage.

FIG. 10A is a graph showing an energy envelope of the received modulated acoustic carrier signal 111 from which the peak level is detected; and FIG. 10B is a graph showing the energy envelope of a normalized modulated acoustic carrier signal 111 after the dynamic gain stage.

According to the exemplary embodiment, dynamic gain adjustment of the modulated acoustic carrier signal 111 signal in each buffer is performed. In contrast, a conventional FSK system may have an AGC (automatic gain control) or fixed gain that operates over seconds.

Leaky Peak Reduction

In another embodiment, the dynamic gain applied above is decayed at approximately 5% per second. The end is that if the signal abruption increases between buffers, the modulated acoustic carrier signal will never clip, but if the modulated acoustic carrier signal diminishes over time, the gain ratio will track the modulated acoustic carrier signal.

Rasterized Fourier Transform

Frequency detection/discrimination can be an important part of the modulated acoustic carrier signal 111 detection. According to the exemplary embodiment, frequency detection is performed using a frequency-domain operation referred to herein as, a Rasterized Digital Fourier Transform (RFT) (step 906). In an alternative embodiment, signal detection could be performed using a time-domain based algorithm.

Usually when thinking of frequency detection in the Frequency Domain, most think of using a Fast-Fourier Transform (FFT). There are two problems with a Fast-Fourier Transform. One is that if only a few frequencies are needed, it is not fast. Two is that the frequency resolution is not very accurate because the FFT bucketizes the signals and if detection of 20500 Hz is desired, but the FFT bucket lies at 20225 Hz, either the size of the FFT has to be increased, thus increasing the CPU processor load, or some other FFT bucket management must be performed.

In any case, in the exemplary embodiment an individual Fourier Transform is performed at exactly the frequency needed.

Rasterized Digital Fourier Transform (RFT)

According to the exemplary embodiment, the Rasterized Digital Fourier Transform (RFT) 906 is performed based on a Goertzel frequency transform to identify frequency components of the modulated acoustic carrier signal (step 920). The Goertzel algorithm is a digital signal processing (DSP) technique for identifying frequency components of a signal, but is computationally efficient.

The Goertzel Algorithm is a Discrete Fourier Transform (DFT) suitable for real-time signal analysis. The Goertzel algorithm is a well-documented algorithm and is will not be elaborated here. The Goertzel Algorithm enables individual DFT coefficient generation using a simple recursive filter, incorporating a second-order digital resonator. The Goertzel filter is typically implemented as a second-order Infinite Impulse Response (IIR) band pass filter with the transfer function:

$$H_k(z) = \frac{1 - e^{\left(\frac{j2\pi k}{N_z - 1}\right)}}{1 - 2\cos\left(\frac{2\pi k}{N}\right)z^{-1} + z^{-2}}$$

The Goertzel filter requires 2N real multiplications and additions. The filter is realized without input buffering, since each sample is processed when received. Setting DFT index k to yield an exact frequency of interest fi, i.e., k=N(fi)/fs, where N is the length of the block, fs is the sampling frequency (48 kHz), the DFT is computed to detect energy at the exact frequencies of interest.

Figure 11:
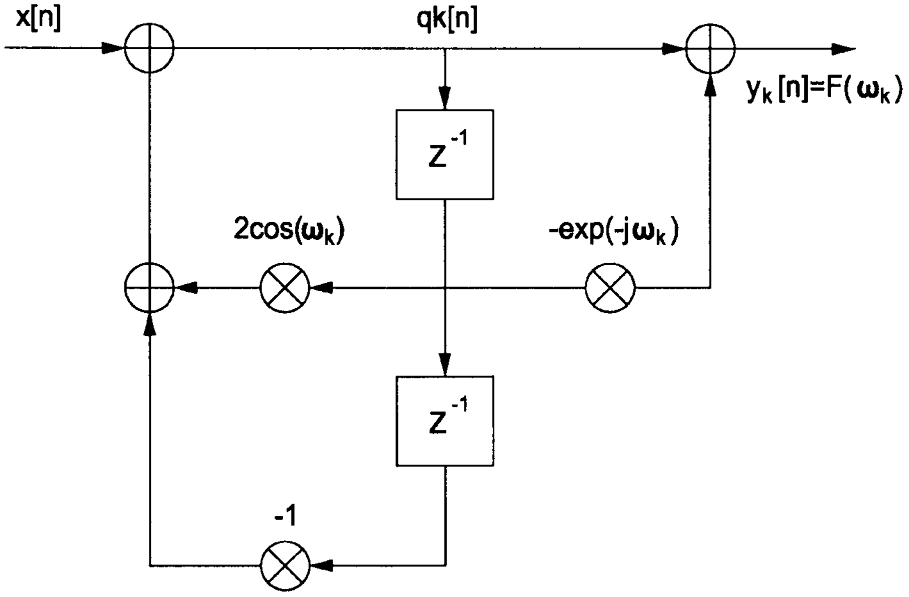
FIG. 11 is a block diagram showing an example implementation of a Goertzel Algorithm.

FIG. 11 is a block diagram showing an example implementation of a Goertzel Algorithm. The Goertzel Algorithm is used in the AMP 107 to reduce the complexity of the mathematical analysis compared to other techniques such as the FFT or DFT. Since the mathematical analysis is reduced, the resultant CPU loading is adequate to achieve real-time processing in the various AMP acoustic systems.

In another aspect of the exemplary embodiment, the use of the Goertzel algorithm to determine the frequency components and amplitudes may be combined with a tuned buffer windowing method to increase frequency discrimination and thus determine the frequency components over time. The window method divides the analysis into smaller portions and is a further way to reduce computation complexity to maintain real-time performance on an embedded system. The windowing involves choosing the length of the Goertzel computation as well as a window of signal overlap to achieve the improved efficiency without loss of resolution. For example, consider a system operating at 100 bps using a 48 kHz sample rate. Each bit period is 1/100 or 10 mS. The 10 mS bit period will contain 480 audio samples. The window method will compute the frequency composition of a subset of those audio samples. If three windows are used, then just 160 samples will be examined.

The RFT 906 is a complex sub-band filter which determines the exact frequency composition of the received signal over short period of interest. It is different than an FIR filter in it has an integrate and dump capability rather than simply modifying the signal. The integrate and dump realizes an accurate power detection of the individual frequency of interest over a finite duration of extreme precision. The varying of the duration of interest allows the AMP detection algorithm to achieve an accurate bit reconstruction while using very little CPU load.

The Goertzel window length can be altered depending on status of decoder in the received device 103. If the decoder is idle waiting for locking signal to start, the window may be adjusted to catch a wide spread of frequencies. Once the locking segment is found, the window adjusts to gain better frequency resolution and give better ability to normalize the gain of each frequency band.

Figure 12:
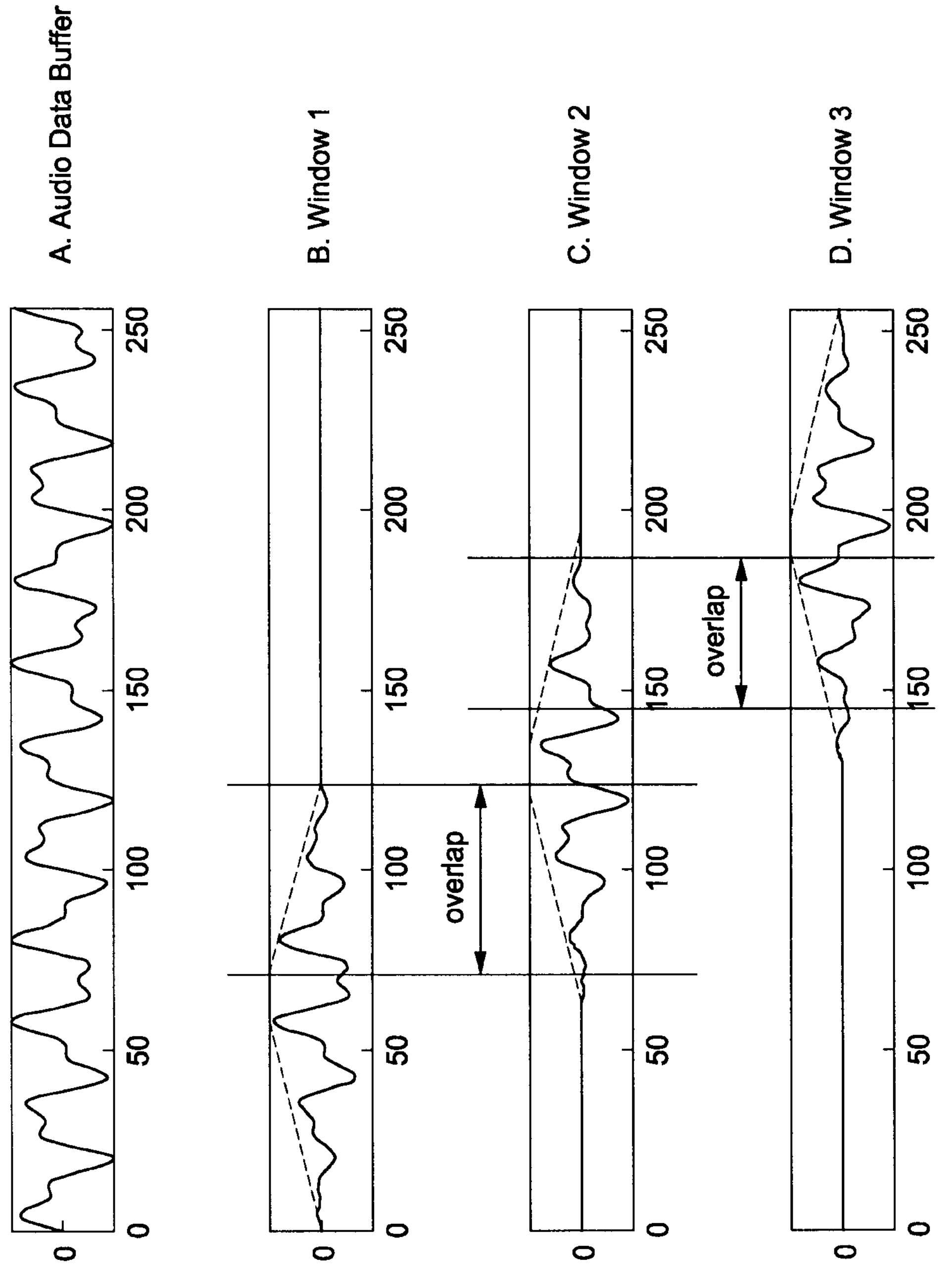
FIG. 12 is a diagram illustrating examples of three overlapping Goertzel analysis windows.

FIG. 12 is a diagram illustrating examples of three overlapping Goertzel windows. Graph A shows an audio data buffer being processed that is sectioned into three analysis time slots called Goertzel windows shown in graphs B-C. Window 1 extends from time 0 to 125, Window 2 extends from time 75 to 175, and Window 3 extends from time 145 to 250. The windows of data are not independent, as Window 2 overlaps some data found in both Window 1 and Window 3. By adjusting the length of the Goertzel window, the amount of overlap with adjacent slots is also varied. The amount of overlap required will vary depending on mode of the state machine (lock, mark, data).

After the Goertzel frequency transform, level matching is performed to dynamically equalize the modulated acoustic carrier signal to remove mismatched attenuation of one signaling frequency versus another (Step 922). The equalization is performed aggressively during the locking phase of data acquisition and then is further adjusted during subsequent phases of bit reconstruction 908.

Sub bit averaging is performed using a windowing method to reduce bit times into time slices and applying a weighting average to determine a statistical best-fit for the bit during an entire bit period based on the time slices, producing individual bits (Step 924).

The acoustic communication demodulation component 124 produces digital data by combining the individual bits, stripping off each start and stop bit and combining a group of 8 bits into bytes (Step 926). A checksum may be used to determine data integrity. [0108] The two frequencies detected by the RFT may have some twist in amplitude. Twist is an amplitude difference that exists usually due to having mismatched signal attenuation between the signaling frequencies due to filter roll-off or signal absorption or other issues. The frequency twist may be determined during the locking segment of the AMP 107, and used for the entire duration of the bit reconstruction phase 908.

The Goertzel output provides a level for each frequency found. This way, the twist is easily identified and compensated for. Gain is added to the lower energy frequency to match the other. In general, if multiple signals are decoded, after untwisting the amplitude, all signals will match the highest energy frequency.

AMP reception needs to occur as buffers are delivered from the specific sound components of the received device 103. In one embodiment, block processing 900 is used to analyze a finite number of samples and a state machine is used to remember the state of the detection during transitions from one buffer to the next.

Figure 13:
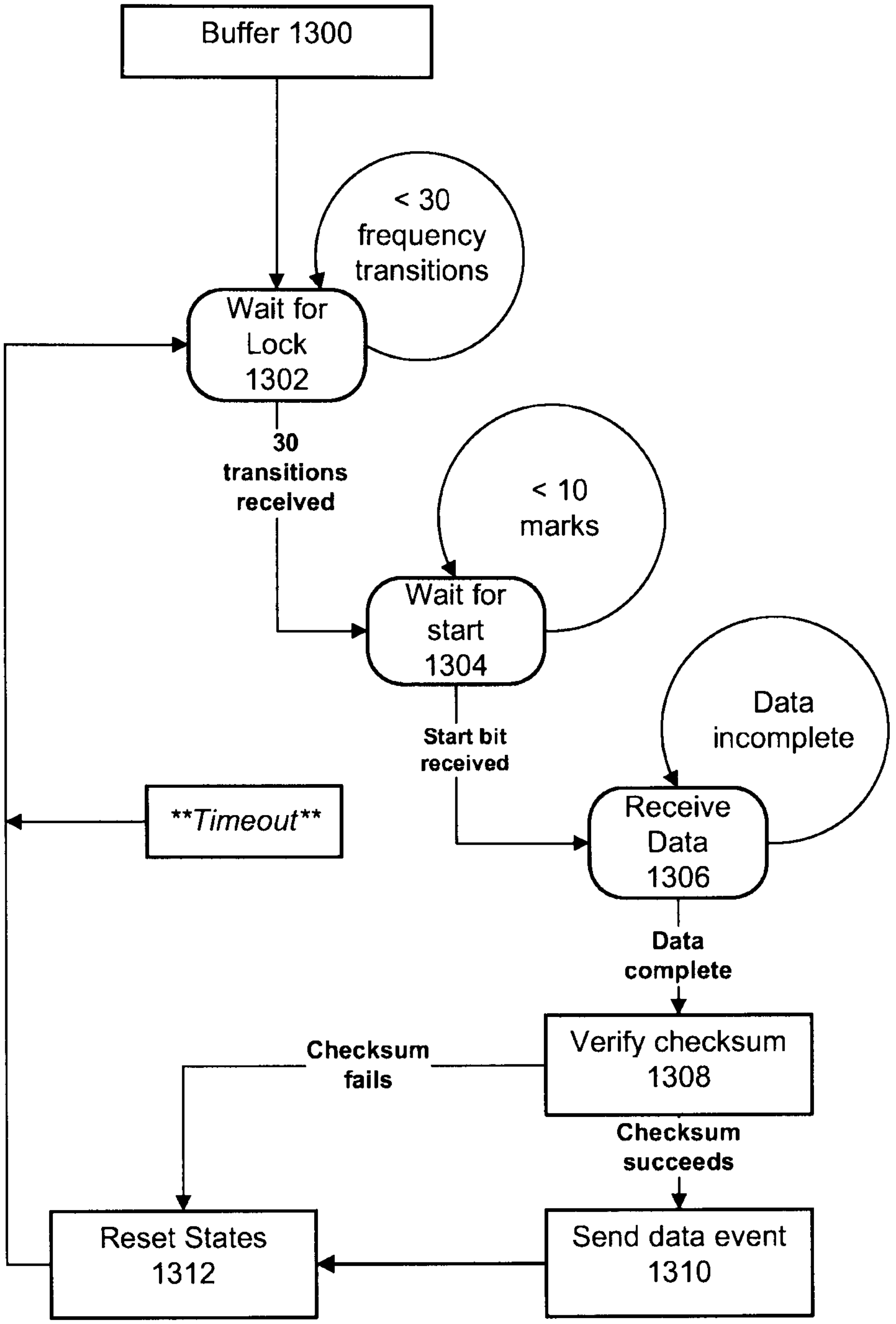
FIG. 13 is a block diagram illustrating details of the decoder state machine to lock onto the modulated acoustic carrier signal.

FIG. 13 is a block diagram illustrating further details of the block processing 900 in which the acoustic communication demodulation component 124 utilizes a decoder state machine to lock onto the modulated acoustic carrier signal 111. The modulated acoustic carrier signal 111 has three distinct components, locking, mark and data (see FIG. 4). A state machine is used to maintain state variables during the buffer processing stage of the reception of the modulated acoustic carrier signal 111. The phases of the state machine match the components of the signal transmission.

As the modulated acoustic carrier signal 111 is received, the modulated acoustic carrier signal 111 is stored as blocks in a buffer 1300 on the receive device 103. During detection of the signal components the locking segment is acquired first. The signal components are locked in during component detection including frequencies, twist, and bitrate. In one embodiment, the acoustic communication demodulation component 124 begins by waiting for a lock until approximately 30 transitions of mark to space have been detected in the locking segment 400 (step 1302). The state machine then advances to acquire the mark segment.

A predetermined length of mark segment 402 must be detected after the locking segment 400 has been detected. In one embodiment, the acoustic communication demodulation component 124 waits for a start of the data until approximately 10 transitions of the mark segment 402 have been detected (step 1304). The AMP state machine then advances to the data segment 404 and data acquisition state.

The data segment 404 comprises of 2 to N words of data followed by a checksum or cyclic redundancy check (CRC). The checksum or the CRC is used to ensure data integrity. AMP data recovery involves making a decision for each bit period whether the bit is a mark (1) or space (0). The decision has several levels of decision processing. The decision processing may be based on some of the same techniques as a Kalman filter. The data is recovered using multiple frequency samples per bit to ensure accurate data recovery.

The acoustic communication demodulation component 124 recovers data by detecting each bit of the data segment 404 and then assembling the bytes by shifting the data (step 1306). In one embodiment, there is no limitation on the length of that data segment 404. After the correct numbers of bytes are received, the data is determined to be complete and data integrity checking ensues.

The signal may be sampled 3 or more times for each bit period to determine the maximum likelihood that the sample is a mark or space.

In one embodiment, enhanced frequency detection may be performed in sub-bit times to further decrease the likelihood of bit errors, as shown in FIG. 12.

There may also be RFT windowing feedback for deeper bit detection analysis if a checksum error is detected.

According to one embodiment, several techniques for forward error correction may be used.

Data Integrity may be determined by comparing the checksum of all data elements against a received checksum byte (step 1308). If the generated and received checksums do match, then a send data event is performed and the demodulated acoustic carrier signal is passed on (step 1310). If the generated and received checksums do not match, the modulated acoustic carrier signal 111 is discarded and all the states reset (step 1312). Other error detection methods such as CRC, parity bit, or hash function could also be employed depending on the demands of the user application. In one embodiment, if the calculated checksum matches the received checksum, the decoder may in turn transmit this value using the AMP protocol back to the transmitting station as way of acknowledgement.

Further Embodiments

The transmit device 101 may use a beacon method and transmit an AMP ID multiple times. The receive device 103 will receive either complete transmissions or partial segments. The receive device 103 can assign confidence to the segment received (based on signal level, gain variation, noise, twist, etc). After all segments have been collected, segments can be ordered according to confidence, then a complete data transmission assembled.

In another embodiment, Forward Error Correction codes could be implemented, such as Reed Solomon, or Low Density Parity Check (LDPC). In order to transmit large blocks of data, smaller segments could be formed with CRC or FEC codes per segment. On the decoding side, each segment could be analyzed individually, with the error-free segments adding up until a complete data block is formed.

Kalman Filtering

According to a further aspect of the exemplary embodiment, Kalman filtering may be used to determine if several redundant acoustic carrier modulated signal inputs can be combined to mitigate bit error occurrences. The Kalman filter may be employed to reduce the noise artifacts associated with the limits in acoustic reproduction of the modulated acoustic carrier signal 111. Kalman filtering augments detection with statistical analysis.

Sensor Input

Some mobile devices have data sensors that can be exploited to increase security and reliability of the data transmission. In one embodiment, an accelerometer (gyroscope) can be used to gate the sound transmission on the transmit device 101. The accelerometer can detect if the transmit device is not positioned properly (i.e., not vertical or horizontal), can determine if the device is in motion, and can determine if the user is shaking the device too much for reliable transmission to occur. Feedback through mechanisms like the vibrator motor, or messages can inform user.

A compass/magnet placed into the receive device 103 may be used to guide the user to place the device in a correct location for reception. A speaker on the receive device 103 can be used as an audio beacon. The transmit device microphone can listen to for the audio beacon signal and once detected, begin transmitting it's AMP ID. This is using sound as a proximity sensor.

A method and system for providing an acoustic modulation protocol (AMP) for enabling transmission of a signal over an acoustics interface has been disclosed. The present invention has been described in accordance with the embodiments shown, and there could be variations to the embodiments, and any variations would be within the spirit and scope of the present invention. For example, the exemplary embodiment can be implemented using hardware, software, a computer readable medium containing program instructions, or a combination thereof. Software written according to the present invention is to be either stored in some form of computer-readable medium such as a memory, a hard disk, or a CD/DVD-ROM and is to be executed by a processor. Accordingly, many modifications may be made by one of ordinary skill in the art without departing from the spirit and scope of the appended claims.

We claim:

1. A computer-implemented method for generating a modulated acoustic carrier signal for wireless transmission from a speaker of a transmit device to a microphone of a receive device, comprising:

converting a message to binary data;

modulating one or more selected frequencies for one or more acoustic carrier signals based on the binary data to generate one or more modulated acoustic carrier signals;

filtering the one or more modulated acoustic carrier signals to remove any unintended audible harmonics created during modulation, including to reduce audibility of the modulated acoustic carrier signal, the filtering further including;

equalizing the modulated acoustic carrier signal to pre-compensate for known degradations that will occur further along a signal path; and setting a level of the modulated acoustic carrier signal for an intended application;

storing the modulated acoustic carrier signal in a buffer for subsequent output and transmission by the speaker as audio over air for receipt by the microphone of the receive device; and, in response to the microphone of the receive device receiving the one or more modulated acoustic carrier signals, demodulating the one or more modulated acoustic carrier signals to recover the binary data using an acoustic modulation protocol by:

receiving the one or more modulated acoustic carrier signals as blocks from one or more buffers;

filtering the one or more modulated acoustic carrier signals to eliminate out-of-band signals and improve signal-to-noise ratio;

dynamically adjusting a gain of the one or more modulated acoustic carrier signals to provide a substantially constant power level for the one or more modulated acoustic carrier signals; and performing a Rasterized Digital Fourier Transform (RFT) that is based on a Goertzel frequency transform in combination with an adjustable Goertzel window length to increase frequency discrimination and to identify frequency components of the one or more modulated acoustic carrier signals.

2. The method of claim 1 wherein the one or more selected frequencies comprise an inaudible frequency greater than 20 kHz.

3. The method of claim 1 wherein the one or more selected frequencies comprises an audible frequency.

4. The method of claim 1 further comprising using a microphone of the transmit device to measure and analyze at least one of ambient noise, audio interference, and the modulated acoustic carrier signal, and in response, performing at least one of setting a speaker level to a higher setting to overcome ambient noise, switching frequencies to minimize the audio interference, and altering equalization of the modulated acoustic carrier signal.

5. The method of claim 1 further comprising constructing multiple (N) modulated acoustic carrier signals that form a parallel data transmission for at least one of: multiplying a base data rate by N, and forming redundant data paths to reduce a chance of bit errors.

6. The method of claim 1 further comprising providing the one or more modulated acoustic carrier signals with a locking segment, a mark segment, and a data segment.

7. The method of claim 6 further comprising providing the data segment with 2 to N words of data followed by at least one of a cyclic redundancy check (CRC) and a checksum.

8. The method of claim 1 further comprising performing the filtering using at least one of a Finite Impulse Response (FIR) filter and an Infinite Impulse Response (IR) filter.

9. The method of claim 1 wherein dynamically adjusting the gain of the one or more modulated acoustic carrier signals further comprises:

detecting a peak level of the one or more modulated acoustic carrier signals, and adjusting the gain of the one or more modulated acoustic carrier signals so that an adjusted peak of the one or more modulated acoustic signal carriers is less than the detected peak level, and so that a power level of the one or more modulated acoustic carrier signals is normalized to 70% to 90% of the detected peak level.

10. The method of claim 1 further comprising performing sub band level matching to dynamically equalize the one or more modulated acoustic carrier signals to remove mismatched attenuation of one signaling frequency versus another.

11. The method of claim 1 further comprising performing sub bit averaging using a windowing method to reduce bit times into time slices and applying a weighting average to determine a statistical best-fit for a bit during an entire bit period based on the time slices.

12. The method of claim 1 wherein the receiving the one or more modulated acoustic carrier signals as blocks from the one or more buffers further comprises using a decoder state model to lock onto the one or more modulated acoustic carrier signals wherein phases of the state machine match components of the one or more modulated acoustic carrier signals.

13. A system, comprising:

a receive device having a microphone; and a transmit device having a processor, memory and a speaker, the processor configured to execute an acoustic modulation protocol that is configured to:

convert a message to binary data;

modulate one or more selected frequencies for one or more acoustic carrier signals based on the binary data to generate one or more modulated acoustic carrier signals;

filter the one or more modulated acoustic carrier signals to remove any unintended audible harmonics created during modulation, including to reduce audibility of the modulated acoustic carrier signal, the filtering further including;

equalize the one or more modulated acoustic carrier signals to pre-compensate for known degradations that will occur further along a signal path; and store the one or more modulated acoustic carrier signals in a buffer for subsequent output and transmission by the speaker as audio over air for receipt by the microphone of the receive device;

wherein in response to the microphone of the receive device receiving the one or more modulated acoustic carrier signals, the receive device executes a demodulation component to recover the binary data using an acoustic modulation protocol that is configured to:

receive data corresponding to the one or more modulated acoustic carrier signals as blocks from one or more buffers;

filter the one or more modulated acoustic carrier signals to eliminate out-of-band signals and improve signal-to-noise ratio;

dynamically adjust a gain of the one or more modulated acoustic carrier signals to provide a substantially constant power level for the one or more modulated acoustic carrier signals; and perform a Rasterized Digital Fourier Transform (RFT) that is based on a Goertzel frequency transform in combination with an adjustable Goertzel window length to increase frequency discrimination and to identify frequency components of the one or more modulated acoustic carrier signals.

14. The system of claim 13 wherein the one or more selected frequencies comprise an inaudible frequency greater than 20 kHz.

15. The system of claim 13 wherein the one or more selected frequencies comprises an audible frequency.

16. The system of claim 13 wherein the acoustic modulation protocol uses a microphone of the transmit device to measure and analyze ambient noise, audio interference, and the modulated acoustic carrier signal, and in response, performs at least one of setting a speaker level to a higher setting to overcome ambient noise, switching frequencies to minimize the audio interference, and altering equalization of the modulated acoustic carrier signal.

17. The system of claim 13 wherein the acoustic modulation protocol constructs multiple (N) modulated acoustic carrier signals that form a parallel data transmission for at least one of: multiplying a base data rate by N, and forming redundant data paths to reduce a chance of bit errors.

18. The system of claim 13 the acoustic modulation protocol provides the one or more modulated acoustic carrier signals with a locking segment, a mark segment, and a data segment.

19. The system of claim 18 the acoustic modulation protocol provides the data segment with 2 to N words of data followed by at least one of a cyclic redundancy check (CRC) and a checksum.

20. The system of claim 13 the acoustic modulation protocol performs the filtering using at least one of a Finite Impulse Response (FIR) filter and an Infinite Impulse Response (IR) filter.

21. The system of claim 13 wherein the demodulation component is configured to dynamically adjust the gain by:

detecting a peak level of the one or more modulated acoustic carrier signals, and adjusting the gain of the one or more modulated acoustic carrier signals so that an adjusted peak of the one or more modulated acoustic signal carriers is less than the detected peak level, and so that a power level of the one or more modulated acoustic carrier signals is normalized to 70% to 90% of the detected peak level.

22. The system of claim 13 wherein the demodulation component performs sub band level matching to dynamically equalize the one or more modulated acoustic carrier signals to remove mismatched attenuation of one signaling frequency verses another.

23. The system of claim 13 wherein the demodulation component performs sub bit averaging using a windowing system to reduce bit times into time slices and applying a weighting average to determine a statistical best-fit for a bit during an entire bit period based on the time slices.

24. The system of claim 13 wherein the demodulation component receives the one or more modulated acoustic carrier signals as blocks from the one or more buffers and using a decoder state model to lock onto the one or more modulated acoustic carrier signals, wherein phases of the state machine match components of the one or more modulated acoustic carrier signals.

25. An executable software product stored on a computer-readable medium containing program instructions for generating a modulated acoustic carrier signal for wireless transmission from a speaker of a transmit device to a microphone of a receive device, the program instructions for:

converting a message to binary data;

modulating one or more selected frequencies for one or more acoustic carrier signals based on the binary data to generate one or more modulated acoustic carrier signals;

filtering the one or more modulated acoustic carrier signals to remove any unintended audible harmonics created during modulation, including to reduce audibility of the modulated acoustic carrier signal, the filtering further including, including;

equalizing the modulated acoustic carrier signal to precompensate for known degradations that will occur further along a signal path;

setting a level of the modulated acoustic carrier signal for the intended application;

storing the modulated acoustic carrier signal in a buffer for subsequent output and transmission by the speaker as audio over air for receipt by the microphone of the receive device; and, in response to the microphone of the receive device receiving the one or more modulated acoustic carrier signals, demodulating the one or more modulated acoustic carrier signals to recover the binary data using an acoustic modulation protocol by:

receiving the one or more modulated acoustic carrier signals as blocks from one or more buffers;

filtering the one or more modulated acoustic carrier signals to eliminate out-of-band signals and improve signal-to-noise ratio;

dynamically adjusting a gain of the one or more modulated acoustic carrier signals to provide a substantially constant power level for the one or more modulated acoustic carrier signals; and performing a Rasterized Digital Fourier Transform (RFT) that is based on a Goertzel frequency transform in combination with an adjustable Goertzel window length to increase frequency discrimination and to identify frequency components of the one or more modulated acoustic carrier signals.

* * * * *